United States Patent
Ito et al.

(10) Patent No.: US 11,204,709 B2
(45) Date of Patent: Dec. 21, 2021

(54) STORAGE SYSTEM AND STORAGE CONTROL METHOD

(71) Applicant: Hitachi, Ltd., Tokyo (JP)

(72) Inventors: Shintaro Ito, Tokyo (JP); Takahiro Yamamoto, Tokyo (JP); Hideo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 71 days.

(21) Appl. No.: 16/796,656

(22) Filed: Feb. 20, 2020

(65) Prior Publication Data
US 2021/0042051 A1 Feb. 11, 2021

(30) Foreign Application Priority Data
Aug. 5, 2019 (JP) .............................. JP2019-144063

(51) Int. Cl.
*G06F 12/00* (2006.01)
*G06F 3/06* (2006.01)

(52) U.S. Cl.
CPC ............ *G06F 3/0647* (2013.01); *G06F 3/067* (2013.01); *G06F 3/0617* (2013.01); *G06F 3/0631* (2013.01); *G06F 3/0653* (2013.01); *G06F 3/0658* (2013.01); *G06F 3/0659* (2013.01); *G06F 3/0683* (2013.01)

(58) Field of Classification Search
CPC .... G06F 3/0647; G06F 3/0659; G06F 3/0658; G06F 3/0683; G06F 3/0631; G06F 3/0617; G06F 3/067; G06F 3/0653; G06F 3/0613; G06F 2212/202; G06F 2212/7207
See application file for complete search history.

(56) References Cited

U.S. PATENT DOCUMENTS

| | | | | |
|---|---|---|---|---|
| 2004/0210731 A1* | 10/2004 | Chatterjee | ............. | G06F 3/0671 711/165 |
| 2009/0193206 A1* | 7/2009 | Ishii | ....................... | G06F 3/0629 711/162 |
| 2010/0199053 A1* | 8/2010 | Otani | ..................... | G06F 3/0647 711/162 |
| 2014/0122797 A1* | 5/2014 | Yadav | ..................... | G06F 3/061 711/114 |
| 2021/0026551 A1* | 1/2021 | Tidke | ....................... | G06F 3/067 |

FOREIGN PATENT DOCUMENTS

JP 2009-181206 A 8/2009

* cited by examiner

*Primary Examiner* — John A Lane
(74) *Attorney, Agent, or Firm* — Procopio, Cory Hargreaves & Savitch LLP

(57) ABSTRACT

Disclosed is a storage system having a plurality of storage nodes, each of the storage nodes including: a non-volatile storage apparatus that stores control information regarding a volume; a capacity controller that performs control associated with writing information to and reading information from the storage apparatus; and a migration controller migrates the volume, in which when the volume is migrated between the storage nodes, the capacity controller updates the control information in response to the migration of the volume performed by the migration controller.

9 Claims, 33 Drawing Sheets

FIG.7

| VIRTUAL VOLUME NO. | VIRTUAL VOLUME ADDRESS | LOGICAL CHUNK NO. | LOGICAL CHUNK ADDRESS |
|---|---|---|---|
| 1 | 1 | 5 | 1 |
| 1 | 2 | 6 | 1 |
| 1 | 3 | - | - |
| 1 | 4 | 5 | 8 |
| ... | ... | ... | |

FIG. 9

| SVOL NO. | SVOL ADDRESS | DIFFERENCE |
|---|---|---|
| 1 | 0 | YES |
| 1 | 1 | YES |
| 1 | 2 | NO |
| 1 | 3 | NO |
| 1 | 4 | NO |
| 2 | 0 | YES |
| 2 | 1 | YES |
| 2 | 2 | NO |
|  | ... | ... |

FIG.11

| HOST VOLUME NO. | COPY STATE | I/O ISSUE DESTINATION VIRTUAL VOLUME NO. | MIGRATION SOURCE VIRTUAL VOLUME NO. |
|---|---|---|---|
| 0 | NO | 10 | - |
| 1 | COPYING | 11 | 15 |
| 2 | NO | 12 | - |
| ... | ... | ... | ... |

FIG.12

| CONTROL INFORMATION | FROZEN STATE | ACCESS RIGHT |
|---|---|---|
| SVOL 1 DIFFERENTIAL BMP | Yes | ALL (READ ONLY) |
| SVOL 2 DIFFERENTIAL BMP | No | NODE 1 STORAGE CONTROLLER |
| SVOL 3 DIFFERENTIAL BMP | No | NODE 4 STORAGE CONTROLLER |
| ... | ... | ... |

FIG.13

| HOST VOLUME NO. | HOST VOLUME ADDRESS | COPIED YES/NO |
|---|---|---|
| 1 | 0 | YES |
| 1 | 1 | YES |
| 1 | 2 | NO |
| 1 | 3 | NO |
| 1 | 4 | NO |
| 2 | 0 | NO |
| 2 | 1 | NO |
| 2 | 2 | YES |
| ... | ... | ... |

FIG.15

| VIRTUAL VOLUME ADDRESS | COPY TARGET |
|---|---|
| 0 | YES |
| 1 | YES |
| 2 | NO |
| 3 | NO |
| 4 | NO |
| 5 | YES |
| 6 | YES |
| 7 | NO |
| ... | ... |

STORAGE SYSTEM AND STORAGE CONTROL METHOD

BACKGROUND OF THE INVENTION

1. Field of the Invention

The present technology relates to a storage system and a storage control method and is suitably applicable, for example, to a storage system and a storage control method that permit migration of a volume between storage nodes.

2. Description of the Related Art

Technologies have been proposed that permit migration of a volume and a snapshot of the volume (snapshot volume) between a plurality of storage subsystems.

For example, a technology is disclosed that permits migration of a snapshot volume to a migration destination storage subsystem by making available a destination volume and a destination snapshot volume in the destination storage subsystem and realizing an update difference between a migration source volume and a migration source snapshot volume as differential data write processing that writes differential data to the destination volume (refer to JP-2009-181206-A).

Recent years have seen increasing demand for software defined storage (SDS) having no dedicated hardware, thus prompting proposals of technologies for implementing software-based storage functions in general-purpose server apparatuses.

For example, a control software deployment method is known in which control software is provided in each storage node in a storage system including the plurality of storage nodes, pieces of control software provided on the different storage nodes form a redundant group, and the pieces of control software belonging to the redundant group update their control information synchronously, thus allowing effective use of resources of the system as a whole.

The technology recited in JP-2009-181206-A permits migration of a snapshot between storage nodes in an SDS. If a storage system goes down in the middle of migration due, for example, to a power outage, information representing a transient state of the migration is lost, making it necessary to start the migration all over again.

The present technology has been devised in light of the foregoing, and it is desirable to propose a storage system capable of continuing with migration of a volume even if the storage system goes down in the middle of the volume migration due, for example, to a power outage.

SUMMARY OF THE INVENTION

According to an embodiment of the present technology, there is provided a storage system that has a plurality of storage nodes. Each of the storage nodes includes a non-volatile storage apparatus, a capacity controller, and a migration controller. The storage apparatus stores control information regarding a volume. The capacity controller performs control associated with writing information to and reading information from the storage apparatus. The migration controller migrates the volume. When the volume is migrated between the storage nodes, the capacity controller updates the control information in response to the migration of the volume performed by the migration controller.

The above configuration stores control information in the non-volatile storage apparatus. For example, therefore, even in the case where the storage nodes are general-purpose computer apparatuses with no batteries, control information will not be lost in the event of the storage system going down due to a power outage during migration of a volume. This makes it possible to resume the volume migration by reading out the control information from the storage apparatus when the storage system is restored.

The present technology realizes a highly reliable storage system.

BRIEF DESCRIPTION OF THE DRAWINGS

FIG. 7 is a diagram illustrating an example of a logical-to-physical conversion table according to the first embodiment;

FIG. 9 is a diagram illustrating an example of a snapshot difference management table according to the first embodiment;

FIG. 11 is a diagram illustrating an example of a host volume management table according to the first embodiment;

FIG. 12 is a diagram illustrating an example of a control information access right management table according to the first embodiment;

FIG. 13 is a diagram illustrating an example of a copied area management table according to the first embodiment;

FIG. 15 is a diagram illustrating an example of a copy target table according to the first embodiment;

DESCRIPTION OF THE PREFERRED EMBODIMENTS

Figure 1:
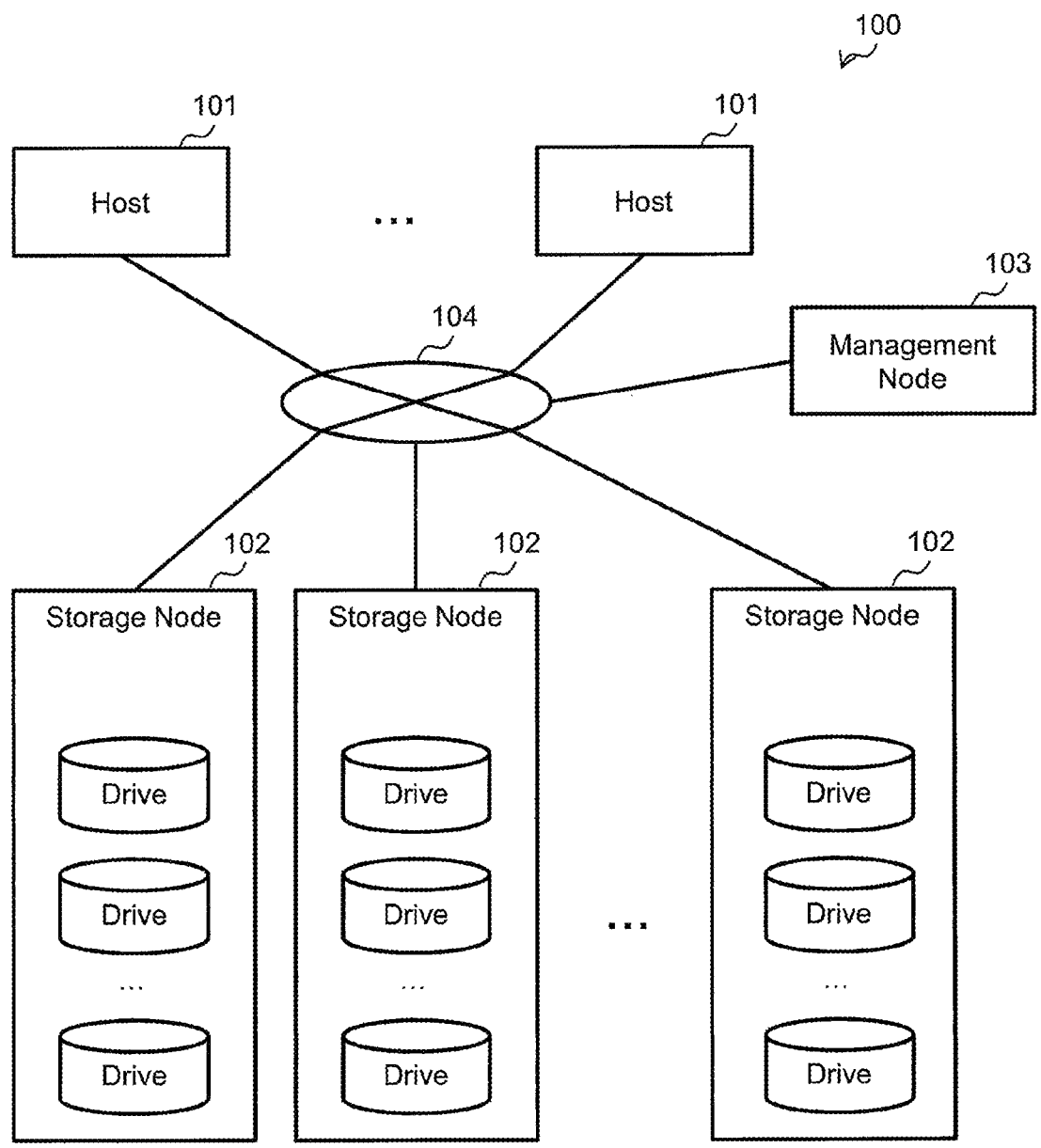
FIG. 1 is a diagram illustrating an example of a configuration of a storage system according to a first embodiment.

A detailed description will be given below of embodiments of the present technology with reference to the attached drawings. The present embodiments relate, for example, to a storage system having a plurality of storage nodes with one or more SDSs implemented therein. In the present embodiments, focus will be placed on a method for resolving a situation in which in the case where a storage system goes down in the middle of migration of a volume due, for example, to a power outage, it is necessary to start the migration all over again as a result of loss of information representing a transient state of the migration. A description will be given further, in the present embodiments, of a method for resolving a situation in which I/O data received during volume migration is lost.

In a snapshot function, it is important not to consume more capacity than necessary by retaining only differential data relative to the volume. That is, it is important, in terms of snapshot function performance and capacity efficiency, not to transfer more data than differential data between the storage nodes and not to write more data than differential data during volume migration. In the present embodiments, a description will also be given of a method for resolving a situation in which the snapshot function deteriorates in terms of performance and capacity efficiency during snapshot volume migration.

It should be noted that, in the following description, in the case where a description is given with no distinction made between components of the same type, of reference numerals including branch numbers, the common portion (the portion excluding the branch numbers) may be used, and in the case where a description is given with distinction made between components of the same type, the reference numerals including the branch numbers may be used. For example, in the case where a description is given with no particular distinction made between storage nodes, the storage nodes may be denoted as "storage nodes 102," and in the case where a description is given with distinction made between individual storage nodes, the storage nodes may be denoted, for example, as a "storage node 102-1" and a "storage node 102-2," respectively.

(1) First Embodiment (1-1) Configuration of the Storage System According to the Present Embodiment In FIG. 1, reference numeral 100 represents a storage system according to a first embodiment as a whole.

The storage system 100 includes, for example, a plurality of host apparatuses 101 (hosts), a plurality of storage nodes 102 (storage nodes), and a management node 103 (management node). The host apparatuses 101, the storage nodes 102, and the management node 103 are connected to each other via a network 104 that includes Fibre channel, Ethernet (registered trademark), or Local area network (LAN).

The host apparatuses 101 are general-purpose computer apparatuses that send read or write requests (hereinafter collectively referred to as I/O requests as appropriate) to the storage nodes 102 in response to requests from application programs implemented. It should be noted that the host apparatuses 101 may be virtual computer apparatuses such as virtual machines.

The storage nodes 102 are computer apparatuses that provide, to the host apparatuses 101, storage areas for reading or writing data. The storage nodes 102 are, for example, general-purpose server apparatuses.

The management node 103 is a computer apparatus used by a system manager to manage the present storage system 100 as a whole. The management node 103 manages the plurality of storage nodes 102 as a group called a cluster. It should be noted that although FIG. 1 illustrates an example in which only one cluster is provided, a plurality of clusters may be provided in the storage system 100.

Figure 2:
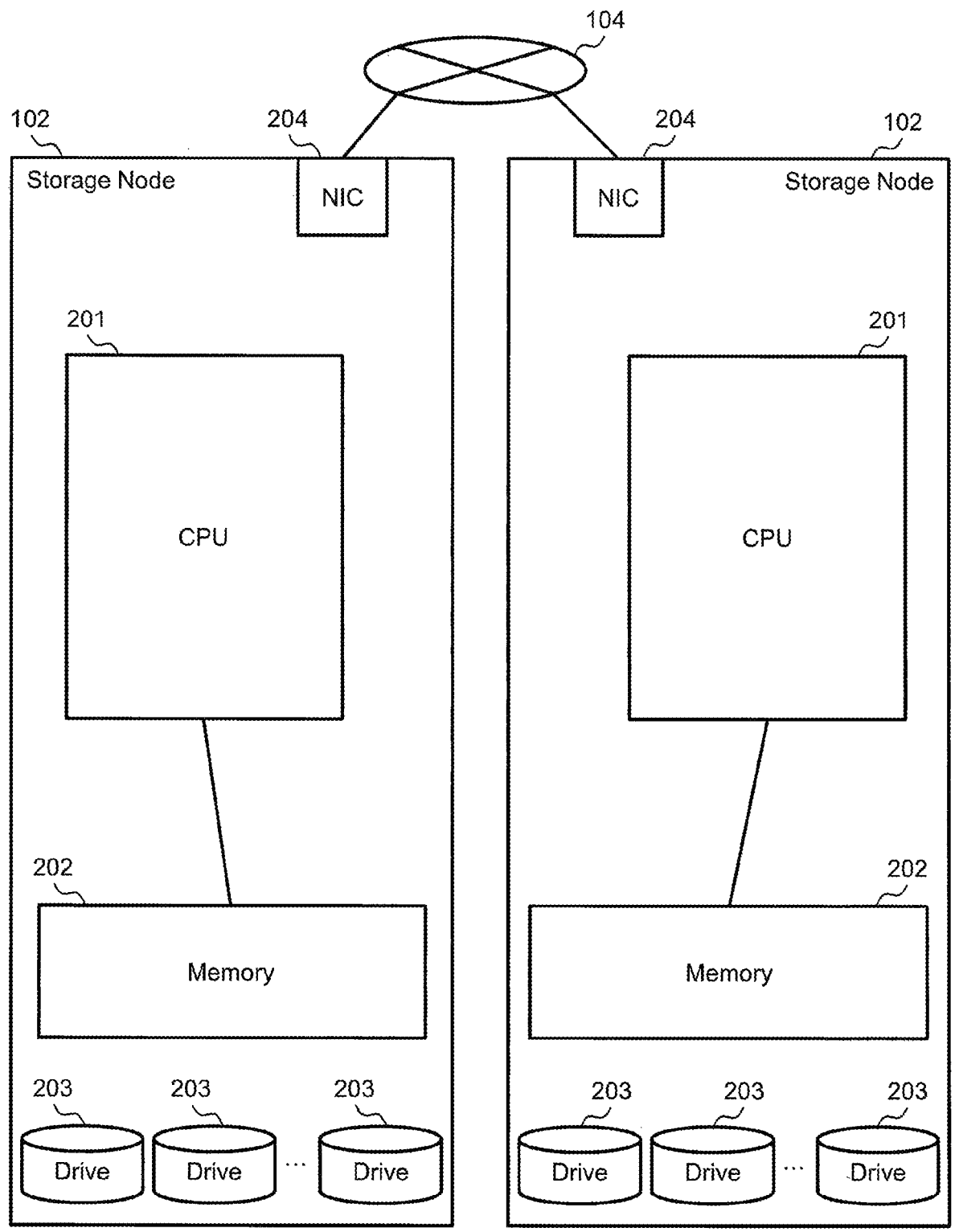
FIG. 2 is a diagram illustrating an example of a physical configuration of a storage node according to the first embodiment.

FIG. 2 is a diagram illustrating an example of a physical configuration of the storage nodes 102.

Each of the storage nodes 102 includes a central processing unit (CPU) 201, a memory 202 (memory), a plurality of storage devices 203 (drives), and a communication apparatus 204 (NIC: network interface card).

The CPU 201 is a processor that controls the operation of the storage nodes 102 as a whole. The memory 202 includes static random access memory (static RAM) (SRAM), dynamic RAM (DRAM), and other volatile semiconductor memories. The memory 202 is used to temporarily retain a variety of programs and necessary data. Various processing tasks of the storage nodes 102 as a whole as will be described later are carried out as a result of execution of the program loaded in the memory 202.

Each of the storage devices 203 includes one or a plurality of types of large-capacity non-volatile storage apparatuses such as solid state drive (SSD), serial attached small computer system interface (serial attached SCSI) (SAS), or serial advanced technology attachment (SATA) hard disk drives.

The storage devices 203 provide a physical storage area for reading or writing data in response to an I/O request from the host apparatuses 101.

The communication apparatus 204 is an interface for the storage nodes 102 to communicate with the host apparatuses 101, the storage nodes 102, and the management node 103 via the network 104. The communication apparatus 204 includes, for example, an NIC or FC card. The communication apparatus 204 handles protocol control during communication with the host apparatuses 101, the storage nodes 102, or the management node 103.

Figure 3:
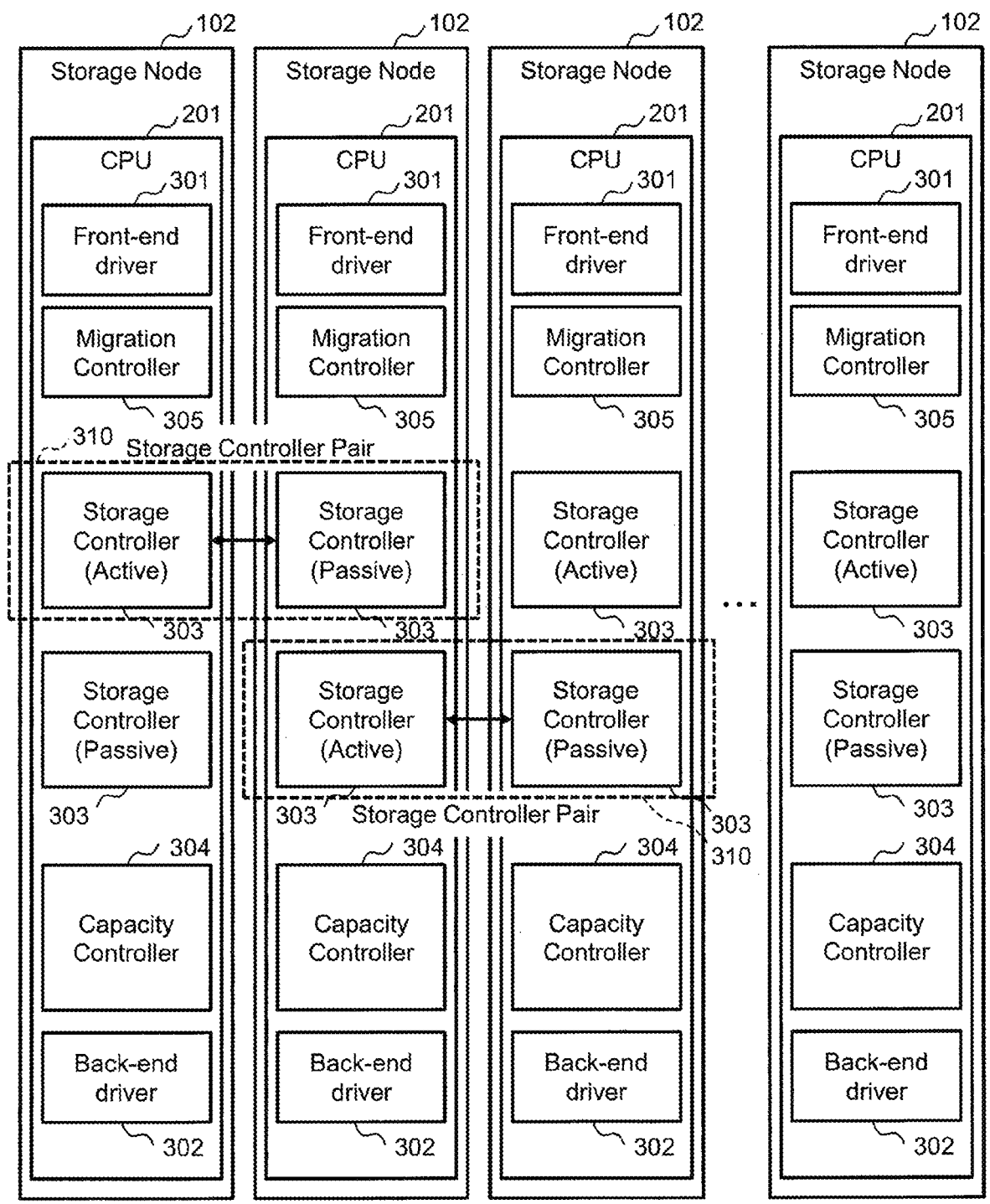
FIG. 3 is a diagram illustrating an example of a logical configuration of the storage node according to the first embodiment.

FIG. 3 is a diagram illustrating an example of a logical configuration of the storage nodes 102.

Each of the storage nodes 102 includes a front-end driver 301 (front-end driver), a back-end driver 302 (back-end driver), one or a plurality of storage controllers 303 (storage controllers), a capacity controller 304 (capacity controller), and a migration controller 305 (migration controller).

The front-end driver 301 is a piece of software that has a function, for the storage controllers 303, to control the communication apparatus 204 and provide, to the CPU 201, an abstract interface during communication with the host apparatuses 101, the storage nodes 102, or the management node 103.

The back-end driver 302 is apiece of software that has a function to control each of the storage devices 203 in its own storage node 102 and provide, to the CPU 201, an abstract interface during communication with each of the storage devices 203.

Each of the storage controllers 303 is a piece of software that functions as an SDS controller. The storage controller 303 receives an I/O request from the host apparatus 101 and issues an I/O command appropriate to the I/O request to the capacity controller 304. The storage controller 303 has a snapshot function.

In the case of the present embodiment, each of the storage controllers 303 implemented in the storage node 102 is managed as one of a pair that forms a redundant configuration with the other storage controller 303 provided in the other storage node 102. In the description given below, this pair will be referred to as a storage controller pair 310.

It should be noted that FIG. 3 illustrates a case in which one storage control pair 310 includes the two storage controllers 303. Although a description will be given below assuming that the one storage control pair 310 includes the two storage controllers 303, a single redundant configuration may include three or more storage controllers 303.

In the storage control pair 310, one of the storage controllers 303 is placed in a state ready to receive I/O requests from the host apparatuses 101 (in a working state and will be hereinafter referred to as active mode). In the storage control pair 310, the other storage controller 303 is placed in a state not ready to receive I/O requests from the host apparatuses 101 (in a standby state and will be hereinafter referred to as passive mode).

In the storage control pair 310, in the case where the storage node 102 in which the storage controller 303 in active mode (hereinafter referred to as an active storage controller 303) is provided fails, the storage controller 303 in passive mode (hereinafter referred to as a passive storage controller 303) until that moment is switched to active mode. This ensures that, in the case where the active storage controller is no longer operational, the I/O processing tasks to be performed by the active storage controller can be taken over by the passive storage controller.

The capacity controller 304 is apiece of software that has not only a function to assign a physical storage area, provided by the storage device 203 in the storage node 102 of its own or the other storage node 102, to each of the storage controller pairs 310 but also a function to read specified data from or write it to the corresponding storage device 203 in accordance with the I/O command given by the storage controller 303.

In this case, when assigning a physical storage area provided by the storage device 203 within the other storage node 102 to the storage control pair 310, the capacity controller 304 works in a coordinated fashion with the capacity controller 304 implemented in the other storage node 102, exchanging data with the capacity controller 304 via the network 104 and reading the data from or writing it to the storage area in accordance with the I/O command given by the active storage controller of the storage control pair 310.

The migration controller 305 is a piece of software that migrates a volume between the storage nodes 102 or between the storage controllers 303.

Figure 4:
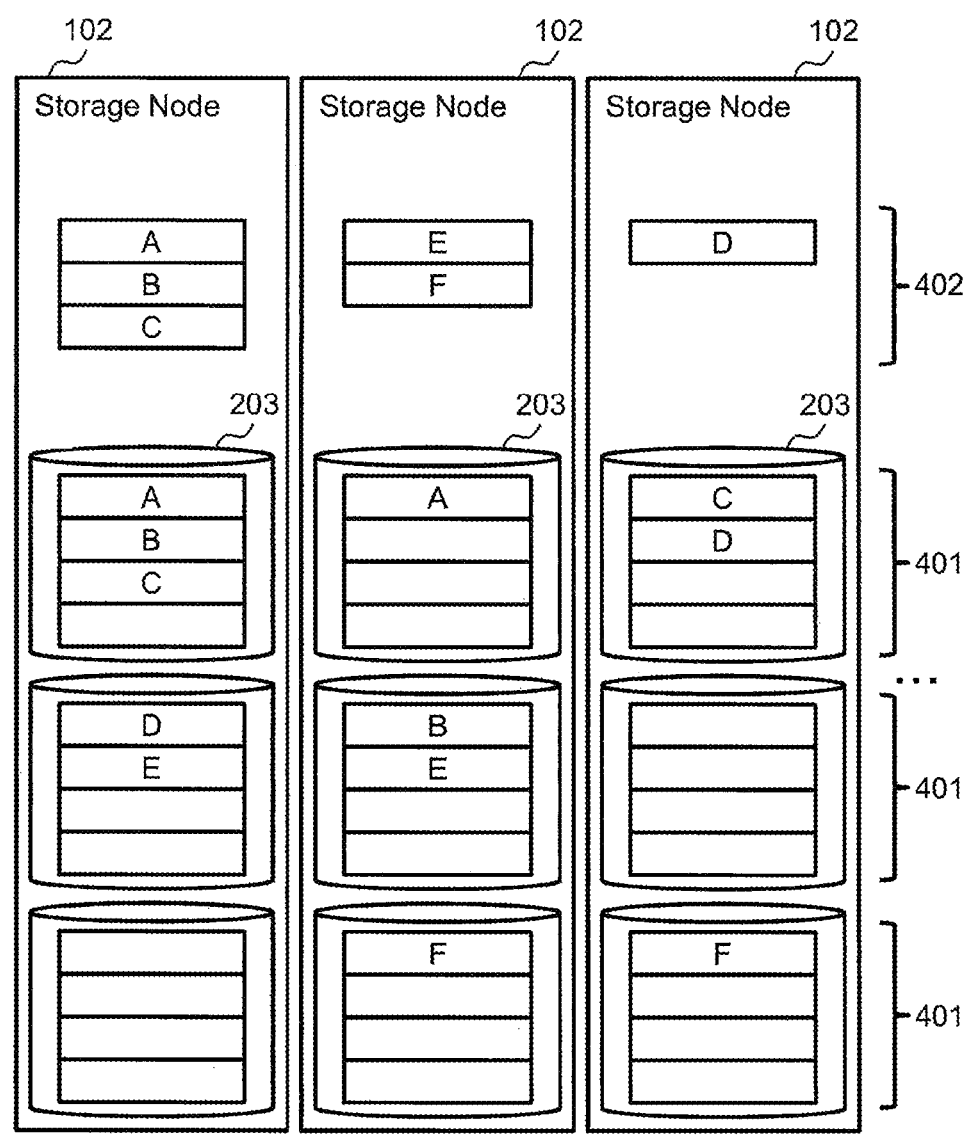
FIG. 4 is a diagram illustrating an example of a storage area according to the first embodiment.

FIG. 4 is a diagram illustrating an example of a storage area managed by the capacity controller 304.

As illustrated in FIG. 4, the capacity controller 304 manages physical storage areas, each provided by the storage device 203 in each storage node 102, in a manner divided into physical storage areas 401 each of which has a given size (hereinafter referred to as physical chunks).

The capacity controller 304 associates each of the storage control pairs 310 with a dedicated pool and assigns, as appropriate, logical storage areas 402 (hereinafter referred to as logical chunks), logical storage areas having the same size as the physical chunks, to these pools, thus associating the logical chunk with the one or plurality of physical chunks.

Further, one or a plurality of virtual logical volumes (hereinafter referred to as virtual volumes or volumes) are defined on each of the storage control pairs 310, thus allowing these virtual volumes to be provided to the host apparatuses 101 as host volumes.

When writing data to such a virtual volume, the host apparatus 101 sends, to one of the storage nodes 102 within the corresponding cluster, a write request that specifies an identifier (logical number unit (LUN)) of a virtual volume to which data will be written (hereinafter referred to as a write target volume) and a storage area to which the data will be written in the write target volume (hereinafter referred to as a write destination storage area).

The front-end driver 301 of the storage node 102 that has received the write request transfers the write request and the data to be written (hereinafter referred to as write data) that has been sent from the host apparatus 101 together with the write request to the front-end driver 301 of each of the storage nodes 102 in which the active or passive storage controller of the storage control pair 310 associated via the write target volume specified in the received write request and the pool is provided.

The front-end driver 301 of the storage node 102 that has received the write request and the write data hands over the write request and the write data to the storage controller 303 of the storage control pair 310 associated via the write target volume specified in the write request and the pool.

The active storage controller of the storage controller 303 to which the write request and the write data have been handed over assigns, as necessary, a storage area (hereinafter referred to as a logical area) from the logical chunk included in the pool associated with the write target volume to the write destination storage area within the write target volume.

The active storage controller generates an I/O command (write command), obtained by converting an address of the write destination storage area of the write target volume specified in the write request into a chunk number of the logical chunk from which a storage area has been assigned to the write destination storage area and an offset position of the logical area, sending the generated I/O command and the write data to the capacity controller 304 of the own storage node 102.

When the I/O command and the write data are received, the capacity controller 304 stores the data in the storage area at the offset position of each of the storage devices 203 that provide the physical chunks, each associated with the logical chunk specified by the I/O command.

As described above, in the storage system 100, data from the host apparatuses 101 is stored in the plurality of physical chunks associated with the corresponding logical chunk. As a result, the number of physical chunks assigned to a logical chunk is determined by details of setting for a redundant scheme used in the storage system 100.

For example, in the case where the storage system 100 is set to store data in duplicate, two physical chunks are assigned to a single logical chunk. In the case where the storage system 100 is set to store data in triplicate or in a more multiplexed fashion, and in the case where the storage system 100 is set to create redundant data from data as in erasure-coding (EC), as many physical chunks as required, three or more, are associated with a single logical chunk.

It should be noted that in the case where data is stored in a multiplexed manner in a plurality of physical chunks by associating the physical chunks with a single logical chunk, one of the plurality of physical chunks is set as a "master" (master surface), and the remaining physical chunks are set as "mirrors" (mirror surfaces). As will be described later, data read from the physical chunks takes place from the physical chunk set as the "master." In the case of EC, a plurality of physical chunks are associated with a single logical chunk, and master data and redundant data are stored in a given pattern in the plurality of physical chunks.

In the case where data is read out from a virtual volume, on the other hand, the host apparatus 101 sends a read request that specifies the LUN of the virtual volume (hereinafter referred to as a read target volume) and a storage area from which the data will be read in the read target volume (hereinafter referred to as a read destination storage area) to one of the storage nodes 102 within the cluster that includes the read target volume.

The front-end driver 301 of the storage node 102 that has received the read request transfers the read request to each of the storage nodes 102 in which the active or passive storage controller of the storage control pair 310 associated via the read target volume specified in the received read request and the pool is provided.

The front-end driver 301 of the storage node 102 that has received the read request hands over the read request to the storage controller 303 of the storage control pair 310 associated via the read target volume specified in the read request and the pool.

The active storage controller of the storage controller 303 to which the read request has been handed over generates an I/O command (read command), obtained by converting the address of the read destination area of the read target volume into a chunk number of the logical chunk from which a storage area has been assigned to the read destination storage area and an offset position of the logical area, sending the generated I/O command to the capacity controller 304 of the own storage node 102.

When the I/O command is received, the capacity controller 304 reads out data from the storage area at the offset position specified by the I/O command within the physical chunk set as the "master" of the physical chunks associated with the logical chunk specified by the I/O command, transferring the data that has been read out as read data to the active storage controller of the sender of the I/O command. The data that has been read out will be subsequently transferred by the active storage controller to the host apparatus 101 of the sender of the read request via the network 104.

(1-2) Assigning Physical Chunks to a Logical Chunk

In the case where a redundant scheme is employed in which data redundancy is achieved by associating a plurality of physical chunks with a single logical chunk and storing data in each of the physical chunks as described above, it is desirable also from the viewpoint of data protection to select the plurality of physical chunks to be associated with a single logical chunk from the physical chunks provided by the different storage nodes 102. The reason for this is that, for example, in the case where the plurality of physical chunks in the same storage node 102 are associated with a single logical chunk, data loss will take place when it is no longer possible to read data from the storage node 102 because of a failure.

For this reason, in the present storage system 100, when the capacity controller 304 assigns a logical chunk to the storage control pair 310 and associates a plurality of physical chunks with the logical chunk, the physical chunks are selected from those provided by the plurality of different storage nodes 102.

On the other hand, in the case where physical chunks to be associated with a logical chunk are selected from those within the storage node 102 different from the storage node 102 in which an active storage controller is provided, the capacity controller 304 that has received an I/O command from the active storage controller (the capacity controller 304 in the same storage node 102 as the active storage controller) needs to communicate with the storage node 102 that provides the physical chunk when data is read from or written to the physical chunk. This deteriorates response performance of the system as a whole to that extent. Therefore, when a plurality of physical chunks are assigned to a logical chunk, it is desirable, also from the viewpoint of response performance of the system as a whole, to select one of the physical chunks from those physical chunks provided by the storage devices 203 within the storage node 102 in which the active storage controller is provided.

Considering the fact that, in the case where the storage node 102 fails in which the active storage controller of the storage controller pair 310 is provided, the passive storage controller is switched to active mode, it is desirable, also from the viewpoint of response performance of the system as a whole and for the same reason as described above, to select one of the physical chunks that will be associated with the logical chunk from those physical chunks provided by the storage devices 203 within the storage node 102 in which the passive storage controller is provided.

For this reason, in the present storage system 100, the capacity controller 304 comes equipped with a capacity priority assignment function. With this function, when assigning a logical chunk to the storage controller pair 310 and associating the logical chunk with a plurality of physical chunks, the capacity controller 304 preferentially selects the physical chunk provided by the storage device 203 within the storage node 102 in which the active storage controller of the storage controller pair 310 is provided and the physical chunk provided by the storage device 203 within the storage node 102 in which the passive storage controller of the storage controller pair 310 is provided.

It should be noted, however, that if physical chunks are associated unlimitedly with a logical chunk within the pool assigned to the single storage controller pair 310 from the storage node 102 in which the active or passive storage controller included in the storage control pair 310 is provided, physical chunks can no longer be associated with a logical chunk of the other storage controller pair 310 having an active or passive storage controller in the storage node 102 from the storage devices 203 within the storage node 102.

For this reason, such a capacity priority assignment function also includes a function to suppress the capacity of physical chunks assigned to the storage control pair 310 from the storage node 102 in which the active storage controller of the storage control pair 310 or the passive storage controller of the storage control pair 310 is provided.

Figure 5:
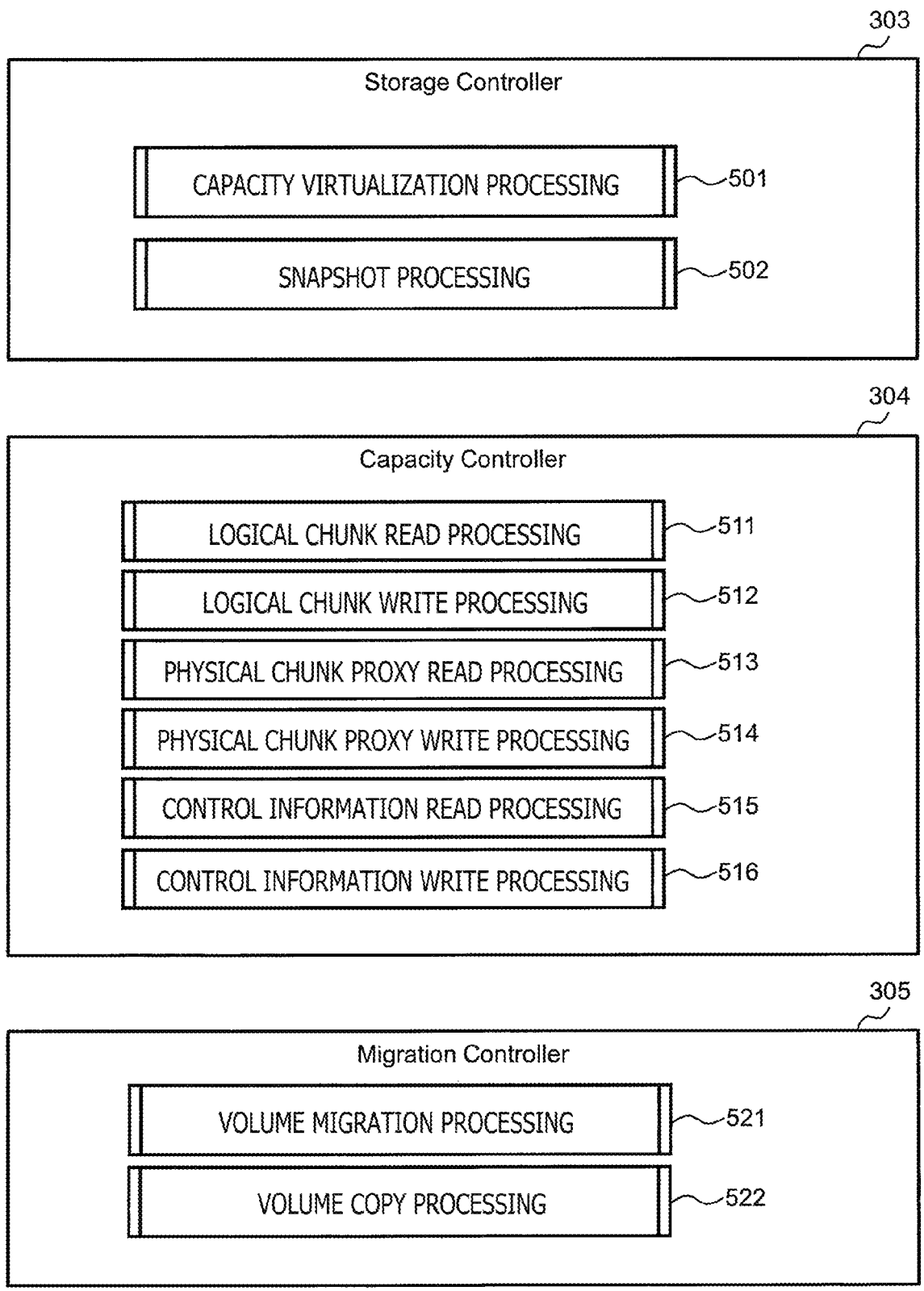
FIG. 5 is a diagram illustrating examples of software module structures according to the first embodiment.

FIG. 5 is a diagram illustrating examples of software module structures of the storage controller 303, the capacity controller 304, and the migration controller 305.

The storage controller 303 performs capacity virtualization processing 501 and snapshot processing 502.

In the capacity virtualization processing 501, the storage controller 303 physically assigns a storage area of the logical chunk to each address space of a virtual volume. When the virtual volume is created, no storage area of the logical chunk has yet to be associated. Therefore, the storage controller 303 assigns the storage area of the logical chunk corresponding to the address to which data from the host apparatus 101 was written. The storage controller 303 manages the presence or absence of assignment and assignment destinations if logical chunk storage areas have been assigned (e.g., logical chunk numbers, logical chunk addresses) by using a logical-to-physical conversion table 700.

In the snapshot processing 502, the storage controller 303 creates a snapshot of the virtual volume (snapshot volume, a replica image of the virtual volume). The original virtual volume from which a snapshot is created is referred to as a PVOL, and the snapshot volume is referred to as an SVOL. The storage controller 303 manages pair relationships between PVOLs and SVOLs with a snapshot pair management table 800 which will be described later. With the exception of the storage areas updated from the moment of snapshot volume creation onward, a PVOL and its SVOL have the same data. Therefore, the PVOL and the SVOL consume a storage area in a single logical chunk. For the SVOL, the PVOL or the SVOL is updated from the moment of creation onward. A storage area of the logical chunk is consumed only for the storage area where a difference arises between the two. The storage controller 303 manages the presence or absence of this difference by using a snapshot difference management table 900 which will be described later. The storage controller 303 also manages a correspondence between the snapshot volume and the storage area of the logical chunk for the storage area having a difference by using a snapshot logical-to-physical conversion table 1000 which will be described later.

The capacity controller 304 includes logical chunk read processing 511, logical chunk write processing 512, physical chunk proxy read processing 513, physical chunk proxy write processing 514, control information read processing 515, and control information write processing 516. Each of the processing tasks will be described in detail later.

The migration controller 305 includes volume migration processing 521 and volume copy processing 522. Each of the processing tasks will be described in detail later.

Figure 6:
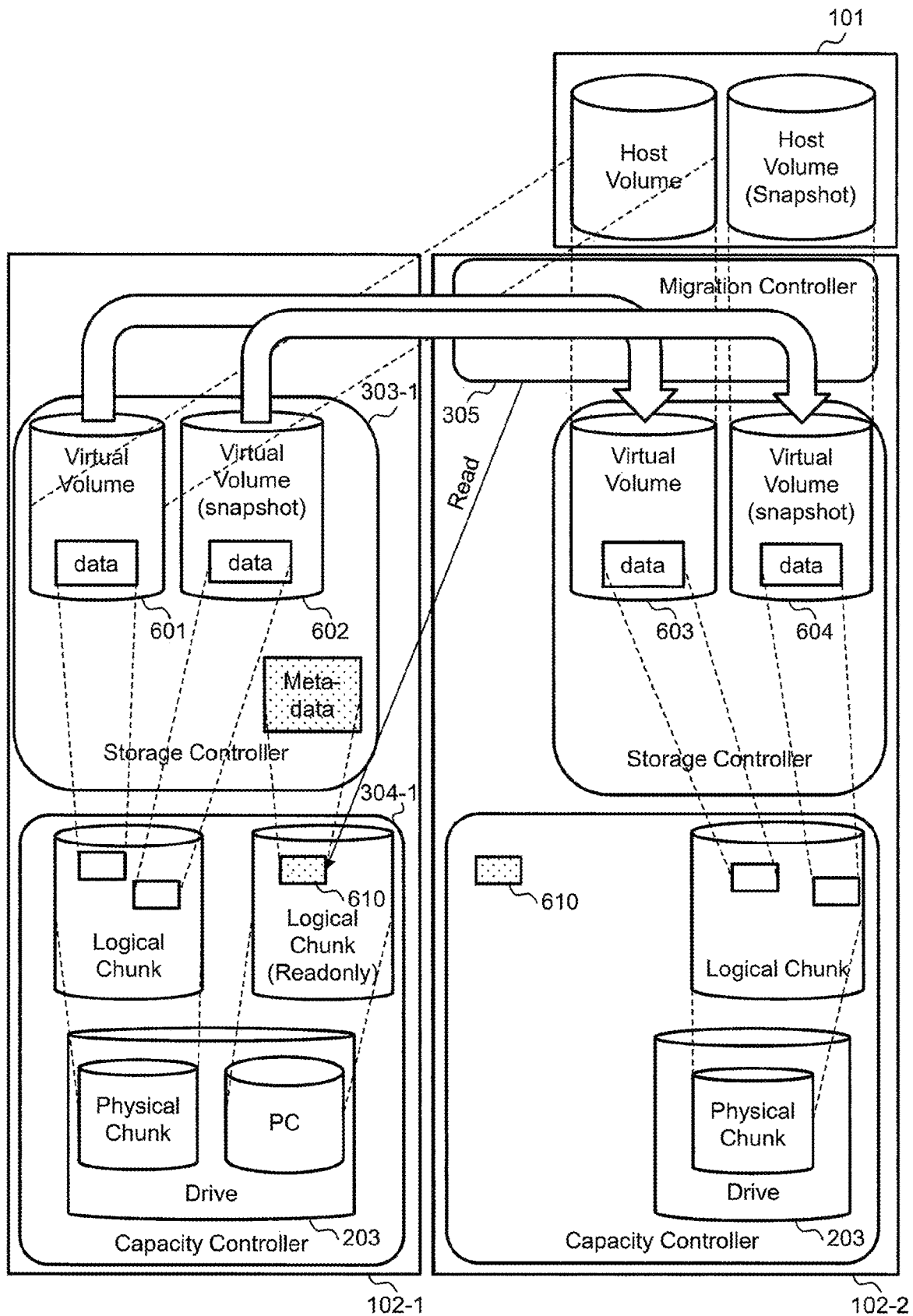
FIG. 6 is a conceptual diagram of the storage system according to the first embodiment.

FIG. 6 is a conceptual diagram of the storage system 100. More specifically, FIG. 6 is a conceptual diagram of a volume migration scheme involving a snapshot in the storage system 100.

The migration controller 305 creates, in a storage controller 303-2 of the migration destination storage node 102-2, a virtual volume 603 (migration destination volume) and a snapshot volume 604 (migration destination snapshot volume) of the virtual volume 603 in association with a virtual volume 601 (migration source volume) of the migration source storage node 102-1 and a snapshot volume 602 (migration source snapshot volume) of the virtual volume 601. The migration controller 305 copies data from the migration source volume and the migration source snapshot volume to the migration destination volume and the migration destination snapshot volume.

At this time, the migration controller 305 can achieve efficient migration involving a snapshot by referring to control information 610 (Meta-data) held by the migration source storage node 102-1 and copying only differential data between the migration source volume and the migration source snapshot volume to the migration destination snapshot volume. In order to refer to the control information 610 retained by the migration source storage node 102-1, the migration controller 305 proceeds with setup to allow a capacity controller 304-1 to freeze (write-disable) control information and assign a read-only reference right to each of the processes including the migration controller 305.

The capacity controller 304-1 stores the control information 610 in the storage devices 203 in a redundant manner as it does data. It should be noted that, although not illustrated, a capacity controller 304-2 stores virtual volume control information provided to the host apparatus 101 by the storage node 102-2 in the storage devices 203 in a redundant manner as it does data. It should be noted, however, that in the case where the storage node 102-2 in which the migration controller 305 is provided has batteries, control information regarding the virtual volume provided to the host apparatus 101 by the storage node 102-2 need not be stored in the storage devices 203.

As an additional remark, although a logical chunk is associated with a physical chunk in FIG. 6, a logical chunk may be associated with a plurality of physical chunks for mirroring or may be rendered redundant by using EC or other technique.

This makes it possible for the migration controller 305 to continue with access without losing control information even in the event of a node failure or a drive failure. Control information is stored in the storage device 203 and will not be lost even in the event of a power outage. For example, if the control information 610 can be temporarily referred to from the other storage nodes 102 via the capacity controller 304-1, the migration controller 305 can refer to the control information 610, thus allowing for efficient migration of the snapshot volume 602 by using the control information 610.

When control information is updated, the control information write processing 516 is performed, and when control information is referred to, the control information read processing 515 is performed. In the case where various tables, specific examples of control information, are referred to in the flows described from here onward, such an interpretation applies. Alternatively, a copy of control information may be retained in the memory 202.

A description will be given below of control information. Tables illustrated in FIGS. 7 to 15 are examples of control information.

FIG. 7 is a diagram illustrating an example of a logical-to-physical conversion table 700. The logical-to-physical conversion table 700 is required to realize a capacity virtualization function. The logical-to-physical conversion table 700 holds an assignment destination logical chunk number 703 and a logical chunk address 704 for each virtual volume address 702 of a virtual volume number 701. In an entry corresponding to an assigned storage area, a value is stored in each of the assignment destination logical chunk number 703 and the logical chunk address 704. On the other hand, no value is stored for an unassigned storage area (which is represented by a hyphen).

Figure 8:
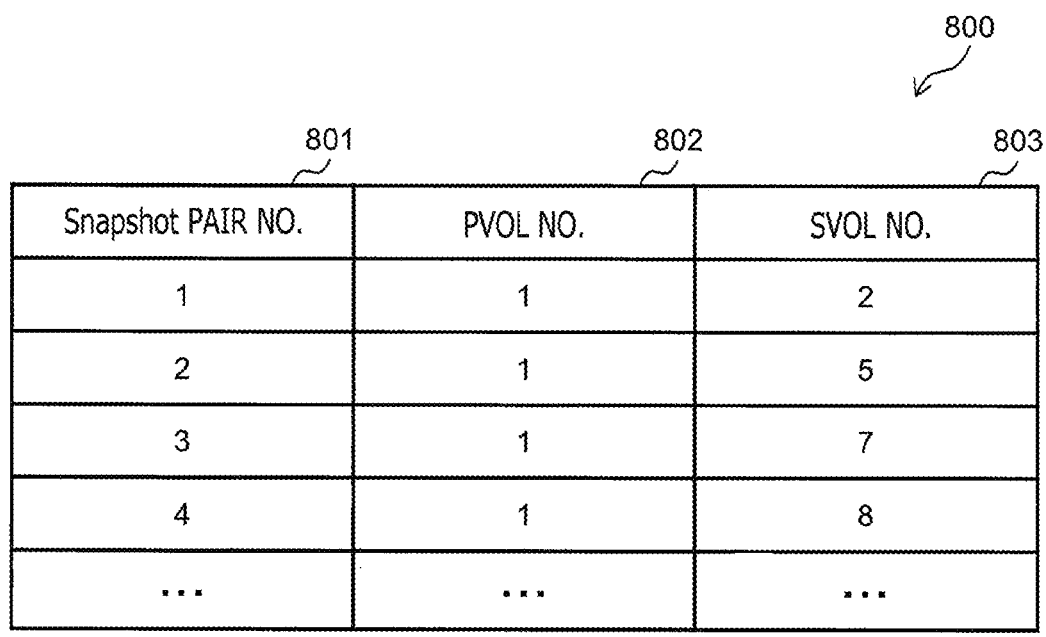
FIG. 8 is a diagram illustrating an example of a snapshot pair management table according to the first embodiment.

FIG. 8 is a diagram illustrating an example of the snapshot pair management table 800. The snapshot pair management table 800 holds a snapshot pair number 801 (Snapshot Pair No.), a PVOL number 802, and an SVOL number 803 for each pair (snapshot pair) of a virtual volume and a snapshot volume of the virtual volume.

FIG. 9 is a diagram illustrating an example of the snapshot difference management table 900. The snapshot difference management table 900 manages in which storage areas there is a difference between the PVOL and SVOL as a differential bitmap (differential BMP). More specifically, the snapshot difference management table 900 holds a difference 903 for each SVOL address 902 (address space) of an SVOL number 901.

Figure 10:
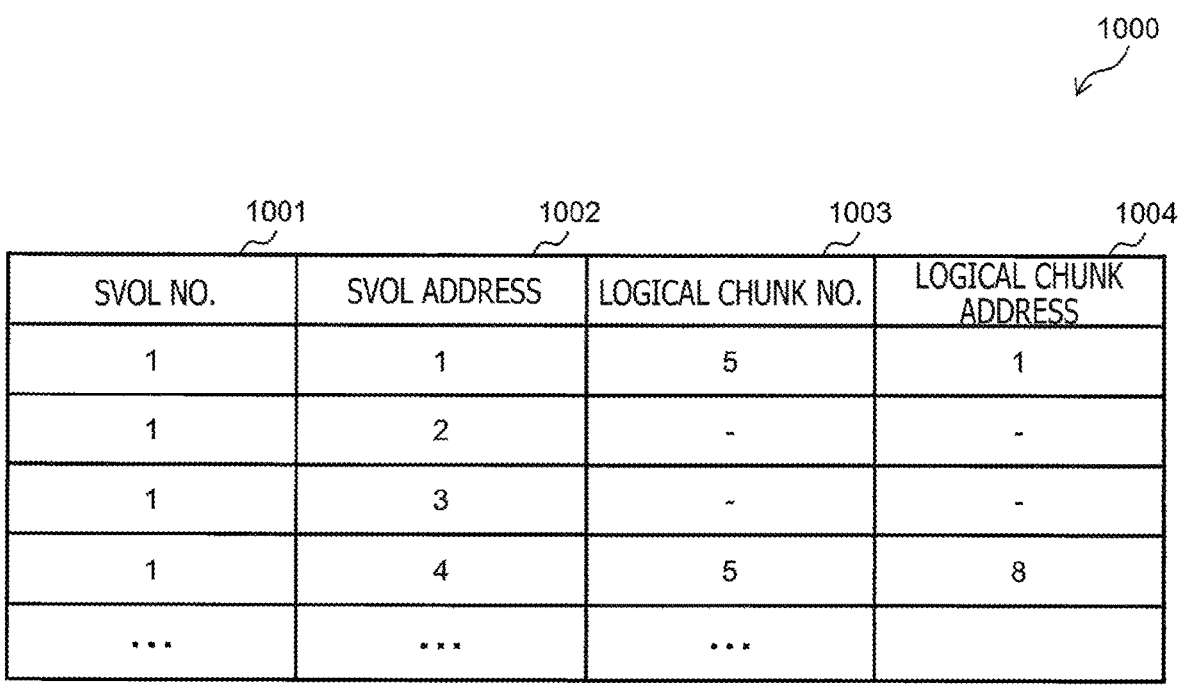
FIG. 10 is a diagram illustrating an example of a snapshot logical-to-physical conversion table according to the first embodiment.

FIG. 10 is a diagram illustrating an example of a snapshot logical-to-physical conversion table 1000. The snapshot logical-to-physical conversion table 1000 holds, in the presence of a difference, a logical chunk number 1003 and a logical chunk address 1004 for each SVOL address 1002 (address space) of an SVOL number 1001.

FIG. 11 is a diagram illustrating an example of a host volume management table 1100. The host volume management table 1100 holds a copy state 1102, an I/O issue destination virtual volume number 1103, and a migration source virtual volume number 1104 for a host volume number 1101 (host volume). The host volume management table 1100 normally has a value only in the I/O issue destination virtual volume number 1103. In the case where the copy state 1102 is "Copying," the host volume management table 1100 has a value in the migration source virtual volume number 1104.

FIG. 12 is a diagram illustrating an example of a control information access right management table 1200. The control information access right management table 1200 holds a frozen state 1202 and an access right 1203 for each piece of control information 1201. "ALL (read only)" or a process identifier is set in the access right 1203. In the case where "ALL (read only)" is set, this means that all processes have a read access right to the control information. In the case where a process identifier is set, only the process has read and write access rights to the control information.

FIG. 13 is a diagram illustrating an example of a copied area management information table 1300. The copied area management information table 1300 is used only during migration of a virtual volume, managing which storage area has been copied for a host volume. The copied area management information table 1300 holds copied yes/no 1303 for each host volume address 1302 of a host volume number 1301.

Figure 14:
FIG. 14 is a diagram illustrating an example of a copy-in-progress difference management table according to the first embodiment.

FIG. 14 is a diagram illustrating an example of a copy-in-progress difference management table 1400. The copy-in-progress difference management table 1400 is used only during migration of a virtual volume, managing which storage area has been updated since the copy started for a host volume as a differential BMP. The copy-in-progress difference management table 1400 holds a difference 1403 for each host volume address 1402 of a host volume number 1401.

FIG. 15 is a diagram illustrating an example of a copy target table 1500. The copy target table 1500 is handed over as input of the volume copy processing 522 and holds a copy target 1502 for each virtual volume address 1501 of a virtual volume. "Yes" is set in the copy target 1502 in the case where the virtual volume address 1501 is a copy target, and "No" is set therein in the case where the virtual volume address 1501 is not a copy target.

Figure 16:
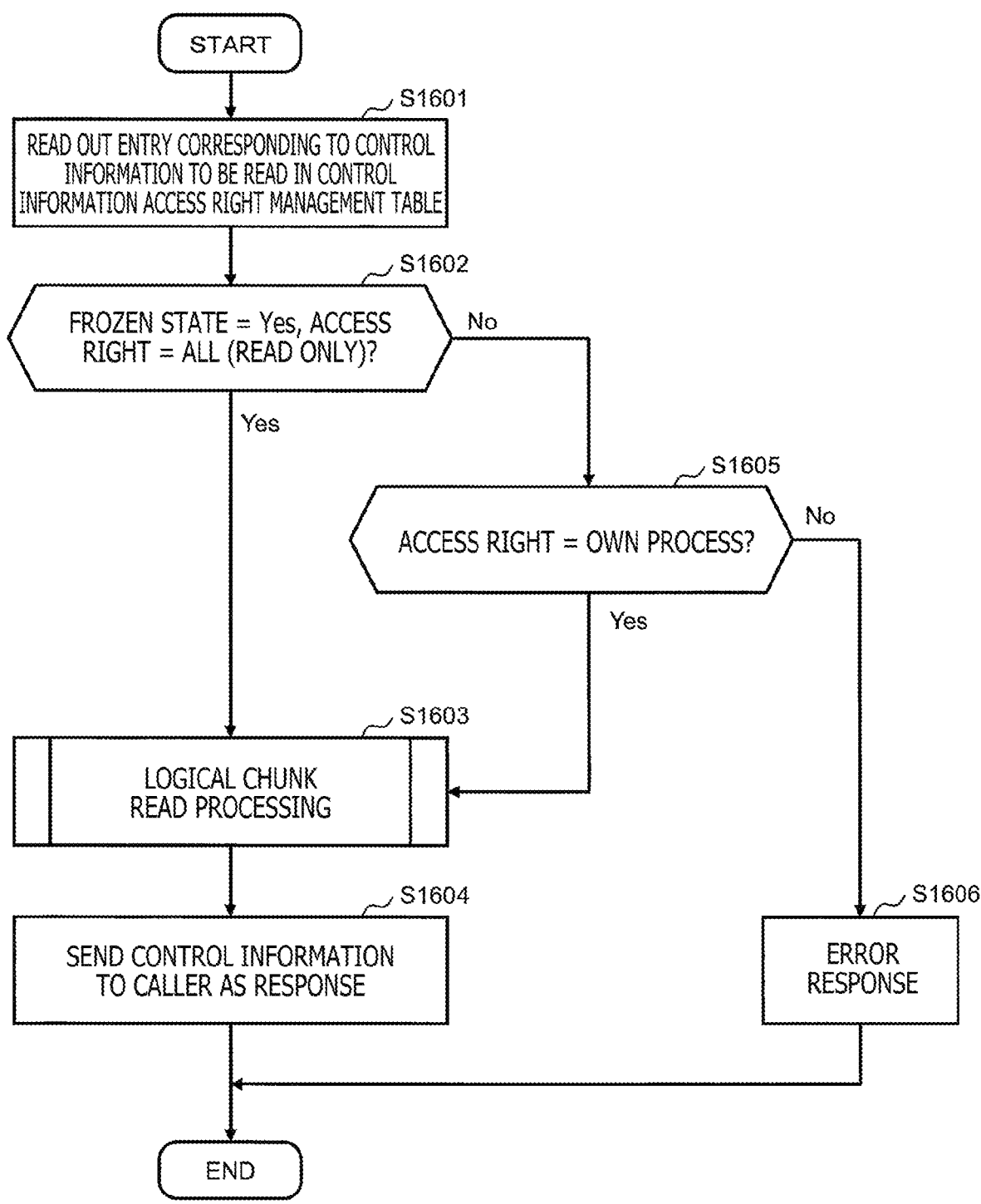
FIG. 16 is a diagram illustrating an example of a flowchart related to control information read processing according to the first embodiment.

FIG. 16 is a diagram illustrating an example of a flowchart related to the control information read processing 515. The control information read processing 515 is performed by the capacity controller 304. The control information read processing 515 is called by specifying a whole or part of control information to be read as a read target.

First, the capacity controller 304 refers to the control information access right management table 1200 and reads out an entry corresponding to control information to be read (step S1601).

Next, the capacity controller 304 judges whether the frozen state 1202 of the control information is "Yes" and whether the access right 1203 is "ALL (read only)" (step S1602). In the case where the capacity controller 304 judges that the frozen state 1202 of the control information is "Yes" and that the access right 1203 is "ALL (read only)," the capacity controller 304 moves the processing to step S1603. On the other hand, in the case where the capacity controller 304 judges that the frozen state 1202 of the control information is not "Yes" or that the access right 1203 is not "ALL (read only)," the capacity controller 304 moves the processing to step S1605.

In step S1603, the capacity controller 304 performs the logical chunk read processing 511. In the logical chunk read processing 511, the capacity controller 304 reads out control information.

Next, the capacity controller 304 sends, as a response, the read control information to the process that made a call (step S1604) and terminates the control information read processing 515.

In step S1605, the capacity controller 304 judges whether its own process has the access right 1203. In the case where the capacity controller 304 judges that its own process has the access right 1203, the capacity controller 304 moves the processing to step S1603. On the other hand, in the case where the capacity controller 304 judges that its own process does not have the access right 1203, the capacity controller 304 moves the processing to step S1606.

In step S1606, the capacity controller 304 sends an error response and terminates the control information read processing 515.

It should be noted that the judgment regarding the access right 1203 may be made for each of the storage nodes 102 rather than on a process-by-process basis.

Figure 17:
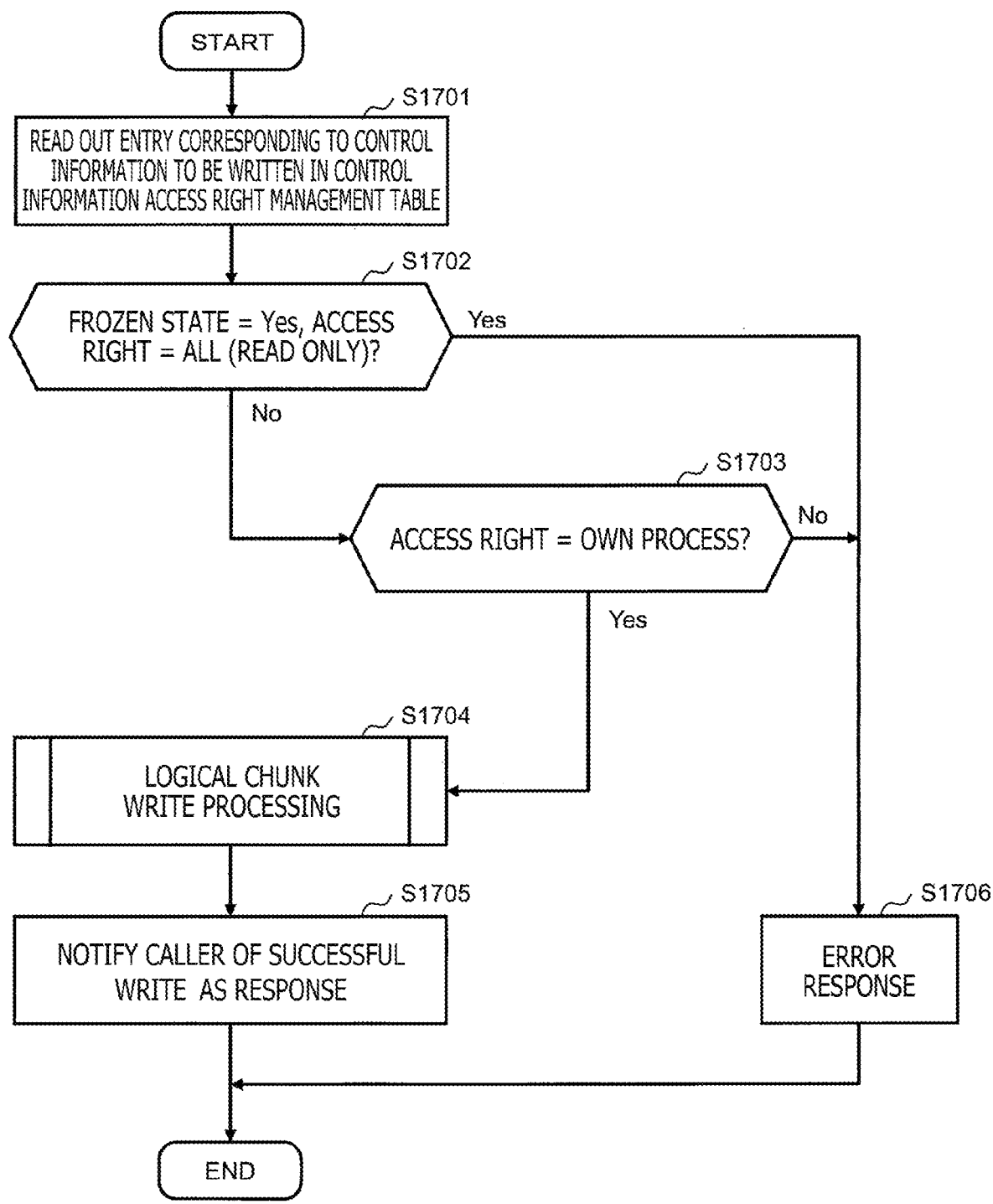
FIG. 17 is a diagram illustrating an example of a flowchart related to control information write processing according to the first embodiment.

FIG. 17 is a diagram illustrating an example of a flowchart related to the control information write processing 516. The control information write processing 516 is performed by the capacity controller 304. The control information write processing 516 is called by specifying a whole or part of control information to be written as a write target.

First, the capacity controller 304 refers to the control information access right management table 1200 and reads out an entry corresponding to control information to be written (step S1701).

Next, the capacity controller 304 judges whether the frozen state 1202 of the control information is "Yes" and whether the access right 1203 is "ALL (read only)" (step S1702). In the case where the capacity controller 304 judges that the frozen state 1202 of the control information is "Yes" and that the access right 1203 is "ALL (read only)," the capacity controller 304 moves the processing to step S1706. On the other hand, in the case where the capacity controller 304 judges that the frozen state 1202 of the control information is not "Yes" or that the access right 1203 is not "ALL (read only)," the capacity controller 304 moves the processing to step S1703.

In step S1703, the capacity controller 304 judges whether its own process has the access right 1203. In the case where the capacity controller 304 judges that its own process has the access right 1203, the capacity controller 304 moves the processing to step S1704. On the other hand, in the case where the capacity controller 304 judges that its own process does not have the access right 1203, the capacity controller 304 moves the processing to step S1706.

In step S1704, the capacity controller 304 performs the logical chunk write processing 512. In the logical chunk write processing 512, the capacity controller 304 updates control information.

Next, the capacity controller 304 notifies, as a response, the caller that the write was successful (step S1705) and terminates the control information write processing 516.

In step S1706, the capacity controller 304 sends an error response to the caller and terminates the control information write processing 516.

Figure 18:
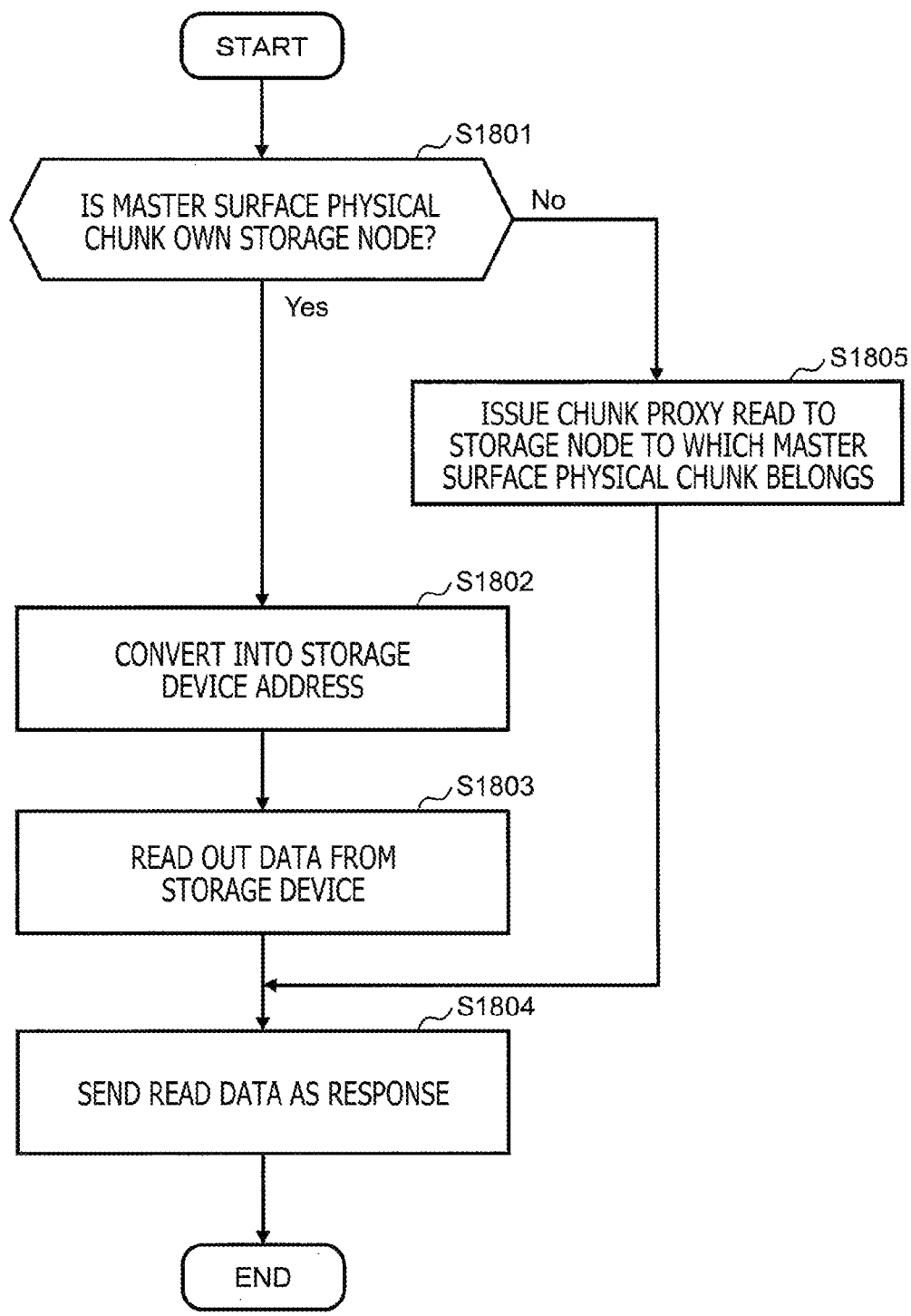
FIG. 18 is a diagram illustrating an example of a flowchart related to logical chunk read processing according to the first embodiment.

FIG. 18 is a diagram illustrating an example of a flowchart related to the logical chunk read processing 511. The logical chunk read processing 511 is performed by the capacity controller 304.

First, the capacity controller 304 judges whether the own storage node 102 has a master surface physical chunk for a specified logical chunk (step S1801). In the case where the capacity controller 304 judges that the own storage node 102 has a master surface physical chunk for the specified logical chunk, the capacity controller 304 moves the processing to step S1802. On the other hand, in the case where the capacity controller 304 judges that the own storage node 102 does not have a master surface physical chunk for the specified logical chunk, the capacity controller 304 moves the processing to step S1805.

In step S1802, the capacity controller 304 converts the offset position of the specified logical chunk into an address of the storage device 203 in which the physical chunk is provided.

Next, the capacity controller 304 reads from the storage device 203 on the basis of the converted address and reads out data (step S1803).

In step S1804, the capacity controller 304 sends the data that has been read out as a response and terminates the logical chunk read processing 511.

In step S1805, the capacity controller 304 issues a physical chunk proxy read request to the storage node 102 to which the master surface physical chunk belongs. The physical chunk proxy read processing 513 is performed in the storage node 102 to which the physical chunk proxy read request has been issued.

Figure 19:
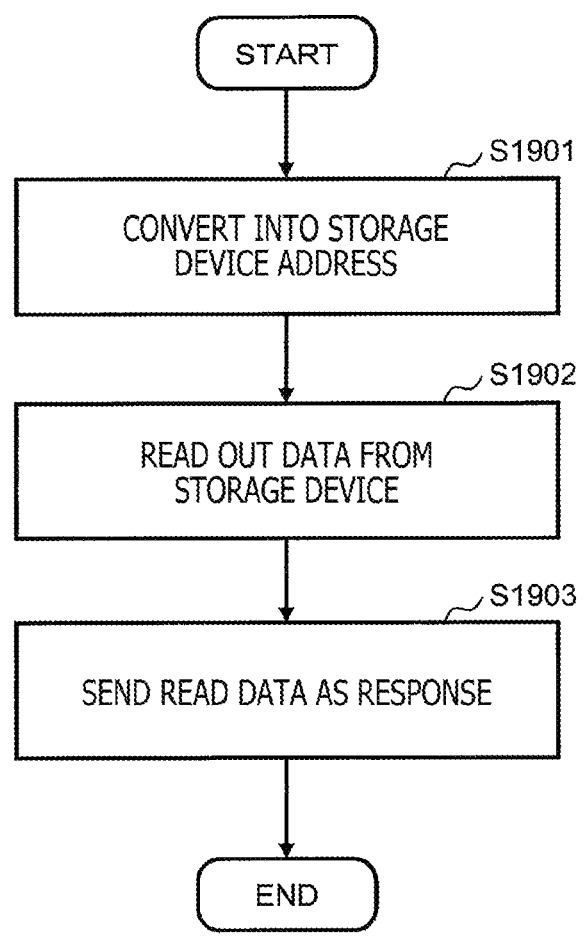
FIG. 19 is a diagram illustrating an example of a flowchart related to physical chunk proxy read processing according to the first embodiment.

FIG. 19 is a diagram illustrating an example of a flowchart related to the physical chunk proxy read processing 513. The physical chunk proxy read processing 513 is requested through communication between the storage nodes 102 and performed by the capacity controller 304.

First, the capacity controller 304 converts the offset position of the specified logical chunk into an address of the storage device 203 in which the physical chunk is provided (step S1901).

Next, the capacity controller 304 reads from the storage device 203 on the basis of the converted address and reads out data (step S1902).

Next, the capacity controller 304 sends the data that has been read out as a response (step S1903) and terminates the physical chunk proxy read processing 513.

Figure 20:
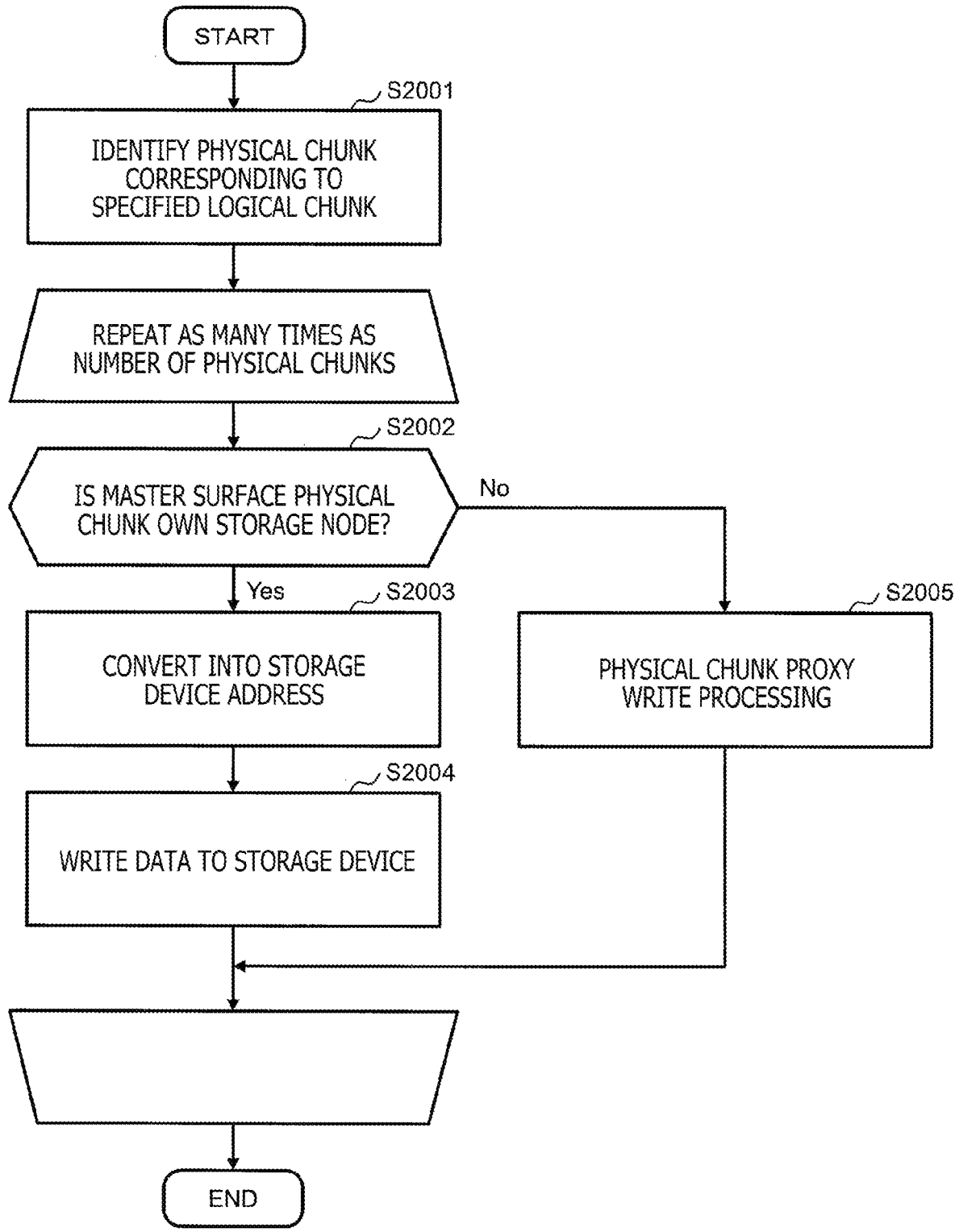
FIG. 20 is a diagram illustrating an example of a flowchart related to logical chunk write processing according to the first embodiment.

FIG. 20 is a diagram illustrating an example of a flowchart related to the logical chunk write processing 512. The logical chunk write processing 512 is performed by the capacity controller 304.

First, the capacity controller 304 identifies a physical chunk corresponding to the specified logical chunk (step S2001). The capacity controller 304 repeats steps S2002 to S2005 as many times as the number of physical chunks identified.

In step S2002, the capacity controller 304 judges whether the own storage node 102 has a master surface physical chunk for the specified logical chunk. In the case where the capacity controller 304 judges that the own storage node 102 has a master surface physical chunk for the specified logical chunk, the capacity controller 304 moves the processing to step S2003. On the other hand, in the case where the capacity controller 304 judges that the own storage node 102 does not have a master surface physical chunk for the specified logical chunk, the capacity controller 304 moves the processing to step S2005.

In step S2003, the capacity controller 304 converts the offset position of the specified logical chunk into an address of the storage device 203 in which the physical chunk is provided.

Next, the capacity controller 304 writes data to the storage device 203 on the basis of the converted address (step S2004).

In step S2005, the capacity controller 304 issues a physical chunk proxy write request to the storage node 102 to which the master surface physical chunk belongs. The physical chunk proxy write processing 514 is performed in the storage node 102 to which the physical chunk proxy write request has been issued.

Figure 21:
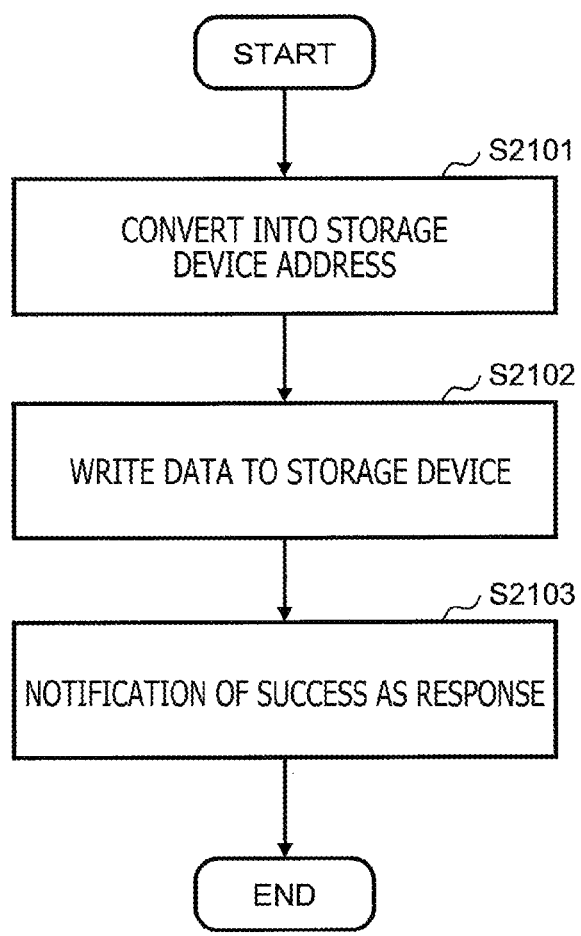
FIG. 21 is a diagram illustrating an example of a flowchart related to physical chunk proxy write processing according to the first embodiment.

FIG. 21 is a diagram illustrating an example of a flowchart related to the physical chunk proxy write processing 514. The physical chunk proxy write processing 514 is requested through communication between the storage nodes 102 and performed by the capacity controller 304.

First, the capacity controller 304 converts the offset position of the specified logical chunk into an address of the storage device 203 in which the physical chunk is provided (step S2101).

Next, the capacity controller 304 writes data to the storage device 203 on the basis of the converted address (step S2102).

Next, the capacity controller 304 gives notification of success as a response (step S2103) and terminates the physical chunk proxy write processing 514.

Figure 22:
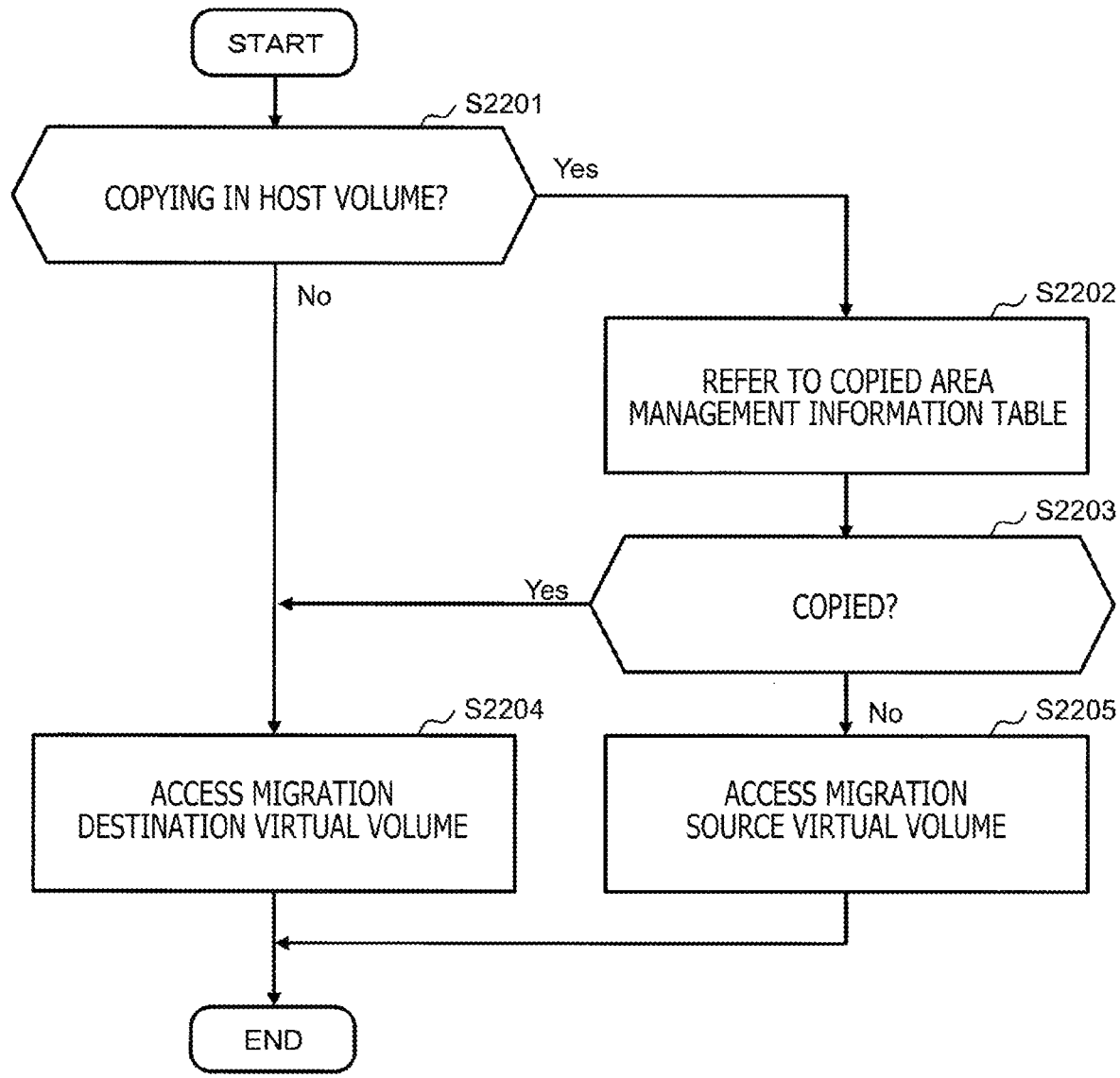
FIG. 22 is a diagram illustrating an example of a flowchart related to host read input/output (I/O) processing according to the first embodiment.

FIG. 22 is a diagram illustrating an example of a flowchart related to host read I/O processing. The host read I/O processing is performed by the front-end driver 301. When the front-end driver 301 receives a read request from the host apparatus 101, the host read I/O processing is called together with a host volume number and a host volume address to be read.

First, the front-end driver 301 refers to the specified host volume management table 1100 and to the copy state 1102 of the entry corresponding to the host volume and judges whether the copy state 1102 is "Copying" (whether copy is in progress in the host volume (step S2201)). In the case where the front-end driver 301 judges that copy is in progress in the host volume, the front-end driver 301 moves the processing to step S2202. On the other hand, in the case where the front-end driver 301 judges that copy is not in progress in the host volume, the front-end driver 301 moves the processing to step S2204.

In step S2202, the front-end driver 301 refers to the entry corresponding to the specified address to be read in the copied area management information table 1300.

Next, the front-end driver 301 judges whether the copied yes/no 1303 of the entry is "Yes" (copy finished) (step S2203). In the case where the front-end driver 301 judges that the copied yes/no 1303 is "Yes," the front-end driver 301 moves the processing to step S2204. On the other hand, in the case where the front-end driver 301 judges that the copied yes/no 1303 is "No," the front-end driver 301 moves the processing to step S2205.

In step S2204, the front-end driver 301 issues a read request to the storage controller 303 to read from a migration destination virtual volume. The migration destination virtual volume is a volume to which an I/O request corresponding to the host volume is issued and belongs to the storage controller 303.

In step S2205, the front-end driver 301 issues a read request to the storage controller 303 to read from a migration source virtual volume. The migration source virtual volume is a volume to which an I/O request corresponding to the host volume is issued and belongs to the storage controller 303.

Figure 23:
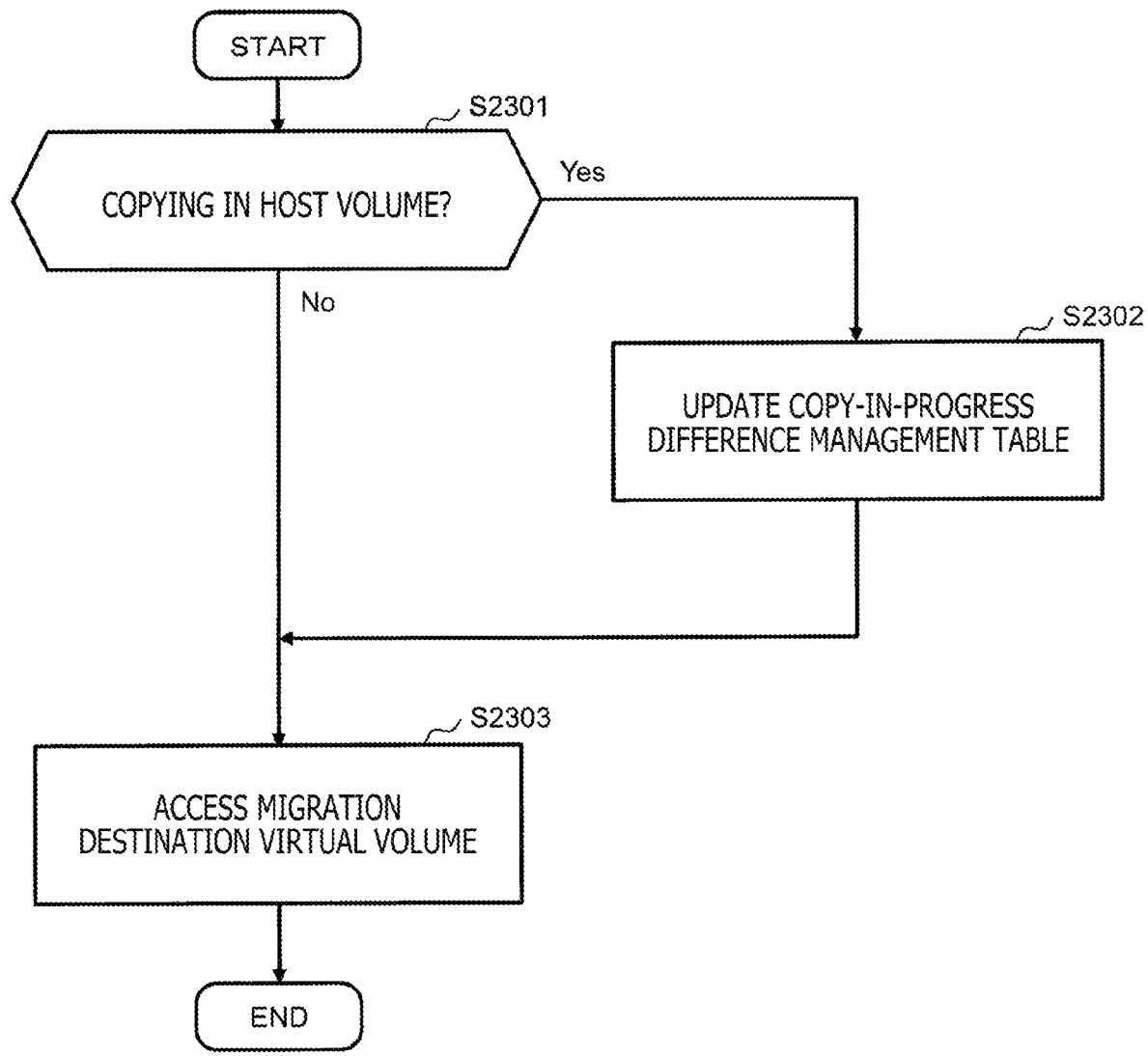
FIG. 23 is a diagram illustrating an example of a flowchart related to host write I/O processing according to the first embodiment.

FIG. 23 is a diagram illustrating an example of a flowchart related to host write I/O processing. The host write I/O processing is performed by the front-end driver 301. When the front-end driver 301 receives a write request from the host apparatus 101, the host write I/O processing is called together with a host volume number and a host volume address to be written.

First, the front-end driver 301 refers to the specified host volume management table 1100 and to the copy state 1102 of the entry corresponding to the host volume and judges whether the copy state 1102 is "Copying" (whether copy is in progress in the host volume (step S2301)). In the case where the front-end driver 301 judges that copy is in progress in the host volume, the front-end driver 301 moves the processing to step S2302. On the other hand, in the case where the front-end driver 301 judges that copy is not in progress in the host volume, the front-end driver 301 moves the processing to step S2303.

In step S2302, the front-end driver 301 updates the copy-in-progress difference management table 1400 and moves the processing to step S2303.

In step S2303, the front-end driver 301 issues a write request to the storage controller 303 to write to a migration destination virtual volume. The migration destination virtual volume is a volume to which an I/O request corresponding to the host volume is issued and belongs to the storage controller 303.

Figure 24:
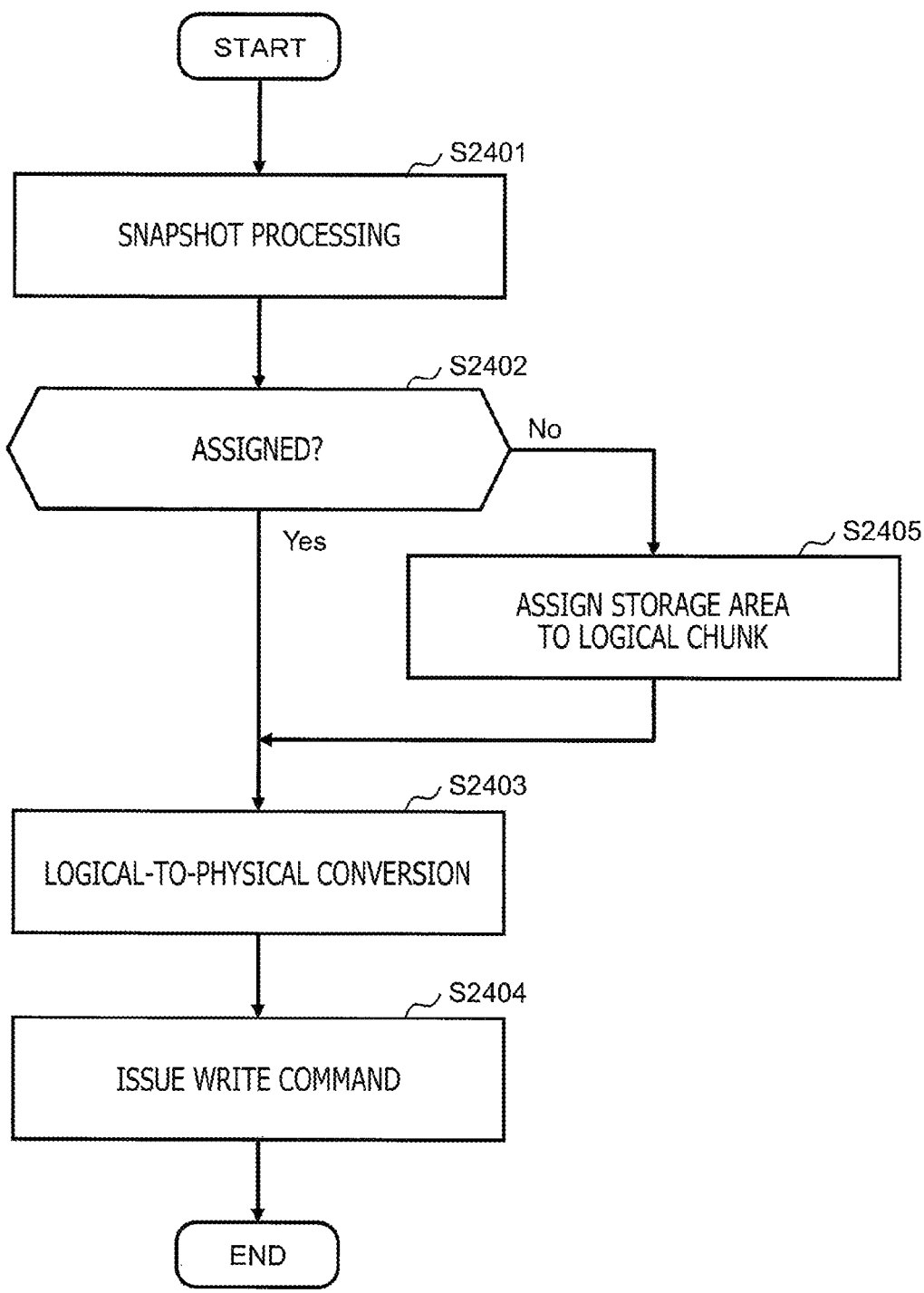
FIG. 24 is a diagram illustrating an example of a flowchart related to virtual volume write I/O processing according to the first embodiment.

FIG. 24 is a diagram illustrating an example of a flowchart related to virtual volume write I/O processing. The virtual volume write I/O processing is performed by the storage controller 303. The virtual volume write I/O processing is called together with a virtual volume number and a virtual volume address.

First, the storage controller 303 performs snapshot processing (step S2401). The snapshot processing refers to a processing task that, in the case where a snapshot volume has been created for the virtual volume, updates the difference 903 of the snapshot difference management table 900 corresponding to the address of the snapshot volume to be written to "Yes" (difference in the entry) and copies snapshot differential data to other storage area of the logical chunk so as to update the entry corresponding to the address of the snapshot logical-to-physical conversion table 1000 to a pointer to the other storage area.

Next, the storage controller 303 refers to the logical-to-physical conversion table 700 and judges whether a logical chunk number and a logical chunk address corresponding to the virtual volume address are assigned (whether the assignment has been completed) (step S2402). In the case where the storage controller 303 judges that the assignment has been completed, the storage controller 303 moves the processing to step S2403. On the other hand, in the case where the storage controller 303 judges that the assignment has yet to be completed, the storage controller 303 moves the processing to step S2405.

In step S2403, the storage controller 303 refers to the logical-to-physical conversion table 700 and calculates a logical chunk number and a logical chunk address corresponding to the virtual volume address.

Next, the storage controller 303 generates a write command including the calculated logical chunk number and logical chunk address, issues the write command to the capacity controller 304 that manages the corresponding logical chunk, and terminates the virtual volume write I/O processing.

In step S2405, the storage controller 303 assigns a storage area corresponding to the virtual volume address to the logical chunk and moves the processing to step S2403.

Figure 25:
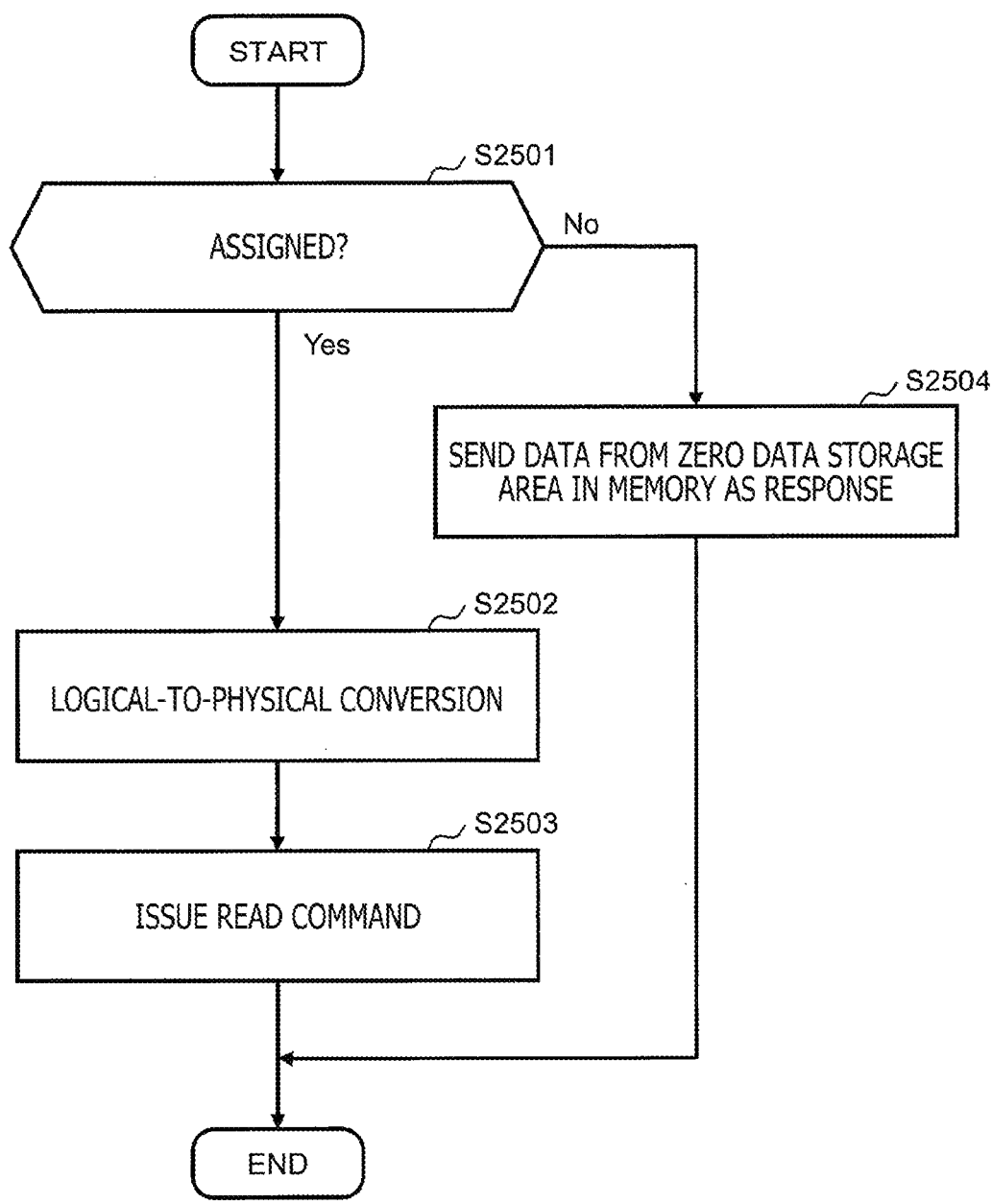
FIG. 25 is a diagram illustrating an example of a flowchart related to virtual volume read I/O processing according to the first embodiment.

FIG. 25 is a diagram illustrating an example of a flowchart related to virtual volume read I/O processing. The virtual volume read I/O processing is performed by the storage controller 303. The virtual volume read I/O processing is called together with a virtual volume number and a virtual volume address.

First, the storage controller 303 refers to the logical-to-physical conversion table 700 and judges whether a logical chunk number and a logical chunk address corresponding to the virtual volume address are assigned (whether the assignment has been completed) (step S2501). In the case where the storage controller 303 judges that the assignment has been completed, the storage controller 303 moves the processing to step S2502. On the other hand, in the case where the storage controller 303 judges that the assignment has yet to be completed, the storage controller 303 moves the processing to step S2504.

In step S2502, the storage controller 303 refers to the logical-to-physical conversion table 700 for the virtual volume address and calculates a logical chunk number and a logical chunk address corresponding to the virtual volume address.

Next, the storage controller 303 generates a read command including the calculated logical chunk number and logical chunk address, issues the read command to the capacity controller 304 that manages the corresponding logical chunk (step S2503), and terminates the virtual volume read I/O processing.

In step S2504, the storage controller 303 does not assign storage areas, and instead, reads out data from a zero data storage area that has been made available in the memory 202, and terminates the virtual volume read I/O processing.

Figure 26:
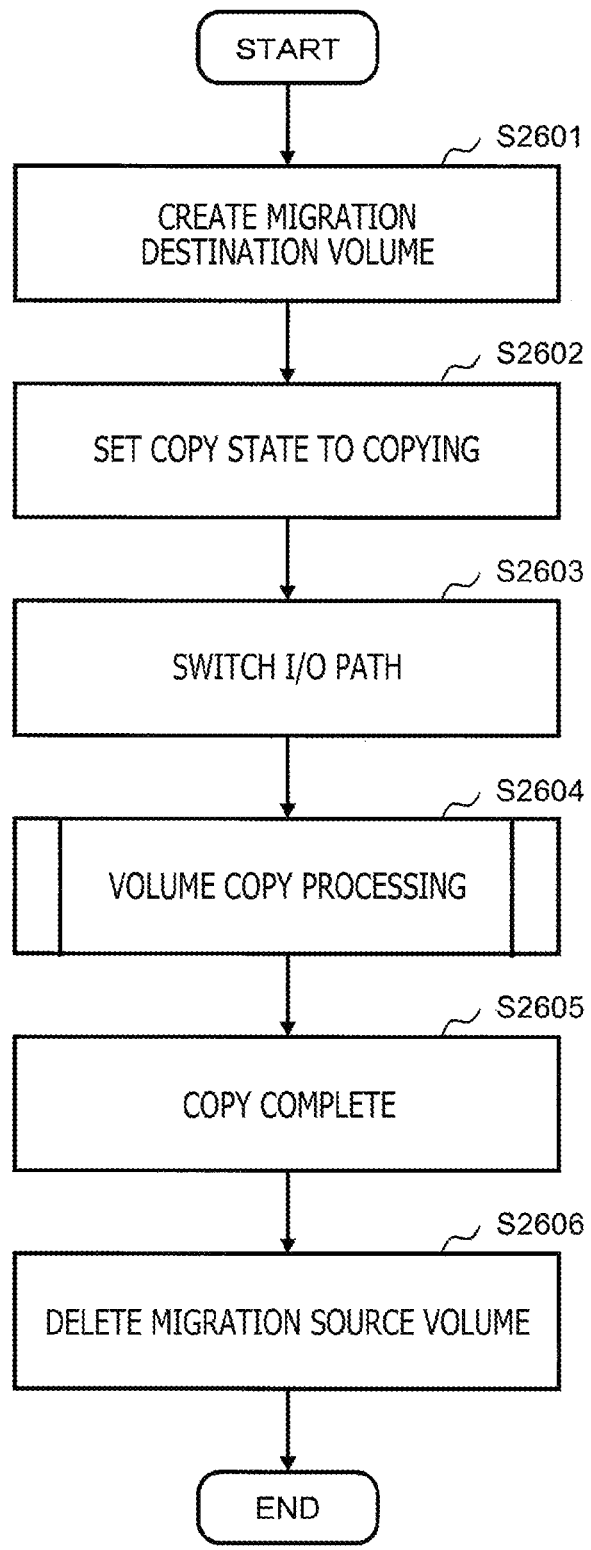
FIG. 26 is a diagram illustrating an example of a flowchart related to volume migration processing according to the first embodiment.

FIG. 26 is a diagram illustrating an example of a flowchart related to the volume migration processing 521. The volume migration processing 521 is performed by the migration controller 305.

First, the migration controller 305 creates a migration destination volume in the migration destination storage node 102 (step S2601). It should be noted that the migration destination volume is identical in size to the migration source volume.

Next, the migration controller 305 selects "Copying" as the copy state of the host volume (step S2602). More specifically, the migration controller 305 sets the copy state 1102 of the host volume in the host volume management table 1100 to "copying."

Next, the migration controller 305 switches the I/O path for the host volume (step S2603). More specifically, the migration controller 305 updates the I/O issue destination virtual volume number 1103 of the entry for the host volume in the host volume management table 1100 to the virtual volume number of the migration destination volume created in step S2601.

Next, the migration controller 305 performs the volume copy processing 522 (step S2604). The volume copy processing 522 inputs the copy target table 1500. Here, the copy target table 1500 is called with "Yes" ("copy required" for all volume spaces) set in the copy target 1502.

When terminating the volume copy processing 522, the migration controller 305 completes the copy (step S2605). More specifically, the migration controller 305 sets the copy state 1102 for the host volume in the host volume management table 1100 to "No."

Next, the migration controller 305 deletes the migration source volume (step S2606) and terminates the volume migration processing 521.

Figure 27:
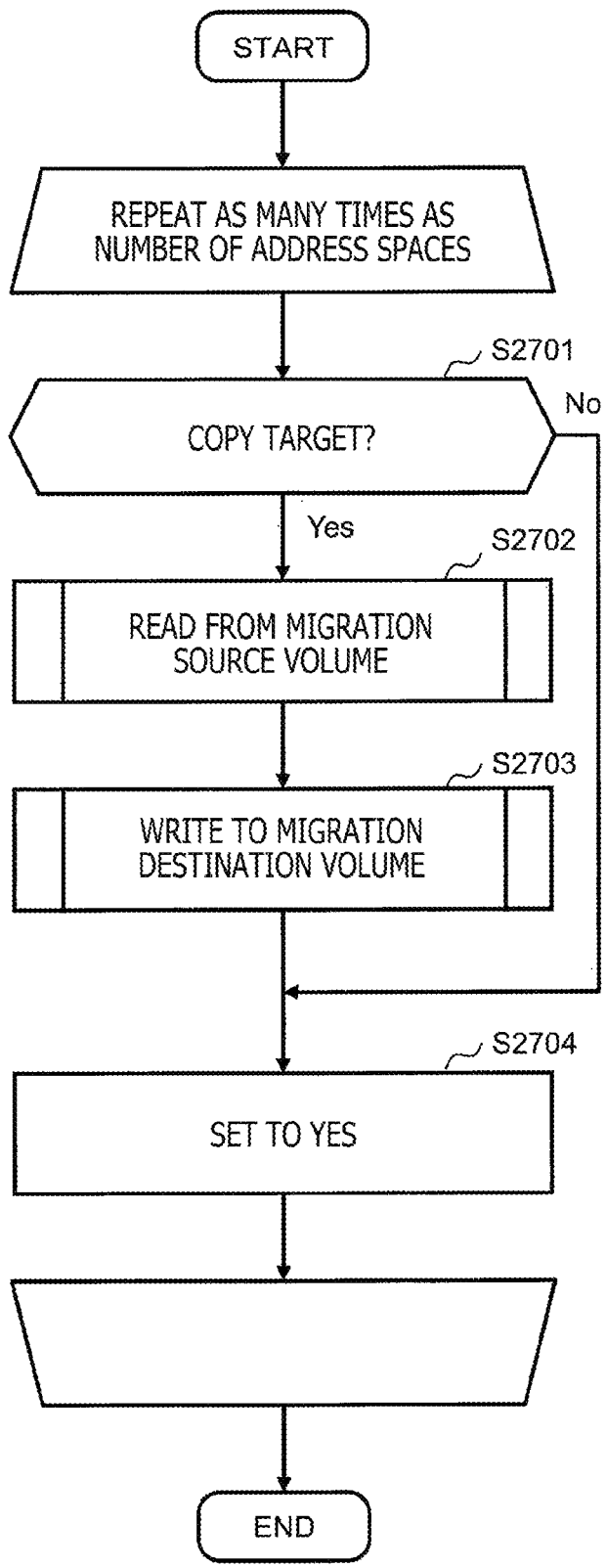
FIG. 27 is a diagram illustrating an example of a flowchart related to volume copy processing according to the first embodiment.

FIG. 27 is a diagram illustrating an example of a flowchart related to the volume copy processing 522. In the volume copy processing 522, the migration controller 305 repeats the processing from step S2701 to step S2704 in all address spaces of the target volume.

First, the migration controller 305 refers to the input copy target table 1500 and judges whether the address is a copy target (step S2701). In the case where the migration controller 305 judges that the address is a copy target, the migration controller 305 moves the processing to step S2702. On the other hand, in the case where the migration controller 305 judges that the address is not a copy target, the migration controller 305 moves the processing to step S2704.

In step S2702, the migration controller 305 reads out data by performing a read of the migration source volume (by calling the host read I/O processing).

Next, the migration controller 305 writes data by performing a write of the read data to the address of the migration destination volume (by calling the host write I/O processing) (step S2703).

In step S2704, the migration controller 305 updates the copied yes/no 1303 of the entry in the copied area management information table 1300 corresponding to the storage area already copied to "Yes." The copied area management information table 1300 manages whether the storage area for each address has yet to be copied. The migration controller 305 terminates the volume copy processing 522 when the copy is completed to the end of the volume.

Figure 28:
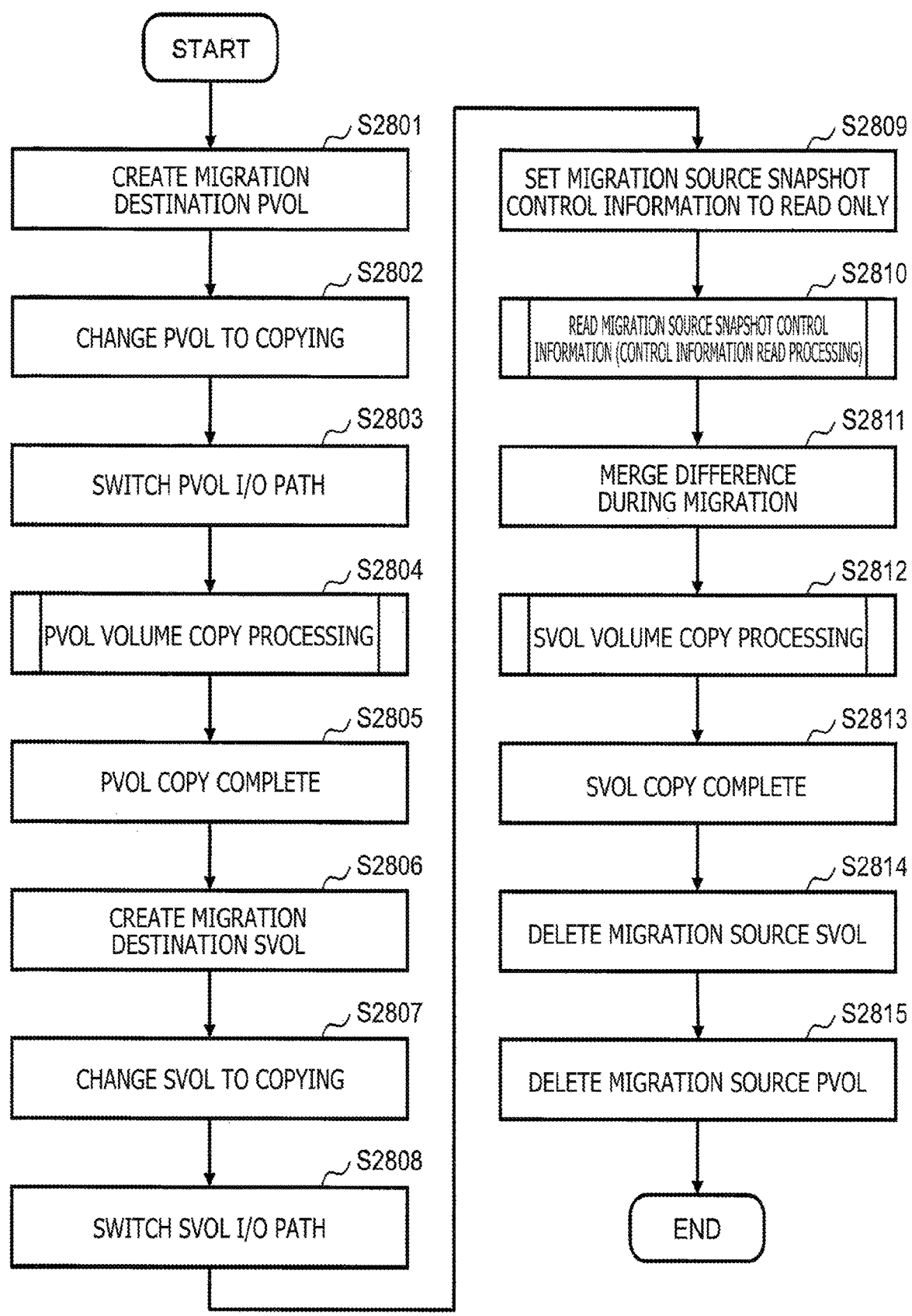
FIG. 28 is a diagram illustrating an example of a flowchart related to volume migration processing involving a snapshot according to the first embodiment.

FIG. 28 is a diagram illustrating an example of a flowchart related to the volume migration processing 521 of a virtual volume and a snapshot volume of the virtual volume (volume migration processing involving a snapshot). The volume migration processing involving a snapshot is performed by the migration controller 305.

Steps from S2801 to S2805 perform similar processing on the PVOL to steps from S2601 to S2605 in FIG. 26 described earlier. The migration controller 305 moves the processing to step S2806 after step S2805 rather than deleting the PVOL.

In step S2806, the migration controller 305 creates a snapshot volume (SVOL) for the migration destination PVOL.

Next, the migration controller 305 changes the copy state of the SVOL to "Copying" (step S2807). This performs similar processing on the SVOL to step S2802.

Next, the migration controller 305 switches the I/O path for the SVOL (step S2808). This performs similar processing on the SVOL to step S2803.

Next, the migration controller 305 selects read-only for snapshot control information of the migration source (e.g., the snapshot difference management table 900 and the snapshot logical-to-physical conversion table 1000) (step S2809). More specifically, the migration controller 305 updates the control information access right management table 1200 of the migration source, setting the frozen state 1202 of the entry for the migration source SVOL to "Yes" and the access right 1203 to "ALL (read only)."

Next, the migration controller 305 calls the control information read processing 515 and reads the snapshot control information of the migration source (step S2810).

Next, the migration controller 305 merges the differences during migration (step S2811). More specifically, the migration controller 305 merges, of the read snapshot control information, the snapshot difference management table 900 with the copy-in-progress difference management table 1400 of the own storage node 102. The term "merging" refers to processing that compares the differences in entry corresponding to the same address of the two tables and generates a differential table having a value of "Yes" in the case where one of the two has "Yes."

The migration controller 305 performs the volume copy processing 522 of the SVOL (step S2812). The migration controller 305 specifies the difference management table, obtained as described above, as the copy target table 1500 and performs a differential copy from the migration source SVOL to the migration destination SVOL by calling the volume copy processing 522. The term. "differential copy" refers to processing that copies only the addresses having an entry such that "Yes" is selected in the copy target 1502 of the copy target table 1500.

Next, the migration controller 305 terminates the copy when the copy is completed to the end of the SVOL (step S2813). More specifically, the migration controller 305 sets the copy state 1102 of the entry corresponding to the SVOL in the host volume management table 1100 to "No."

Next, the migration controller 305 deletes the migration source SVOL (step S2814).

Next, the migration controller 305 deletes the migration source PVOL (step S2815) and terminates the volume migration processing involving a snapshot. It should be noted that although, in the present example, there is only one snapshot, the same also holds true when there are two or more snapshots.

The present embodiment allows for continued migration of a virtual volume even in the event of a power outage, protecting transient I/O data and permitting continued migration of a snapshot volume of the virtual volume.

(2) Second Embodiment

The present embodiment differs from the first embodiment in the host write I/O processing and the volume migration processing involving a snapshot.

Figure 29:
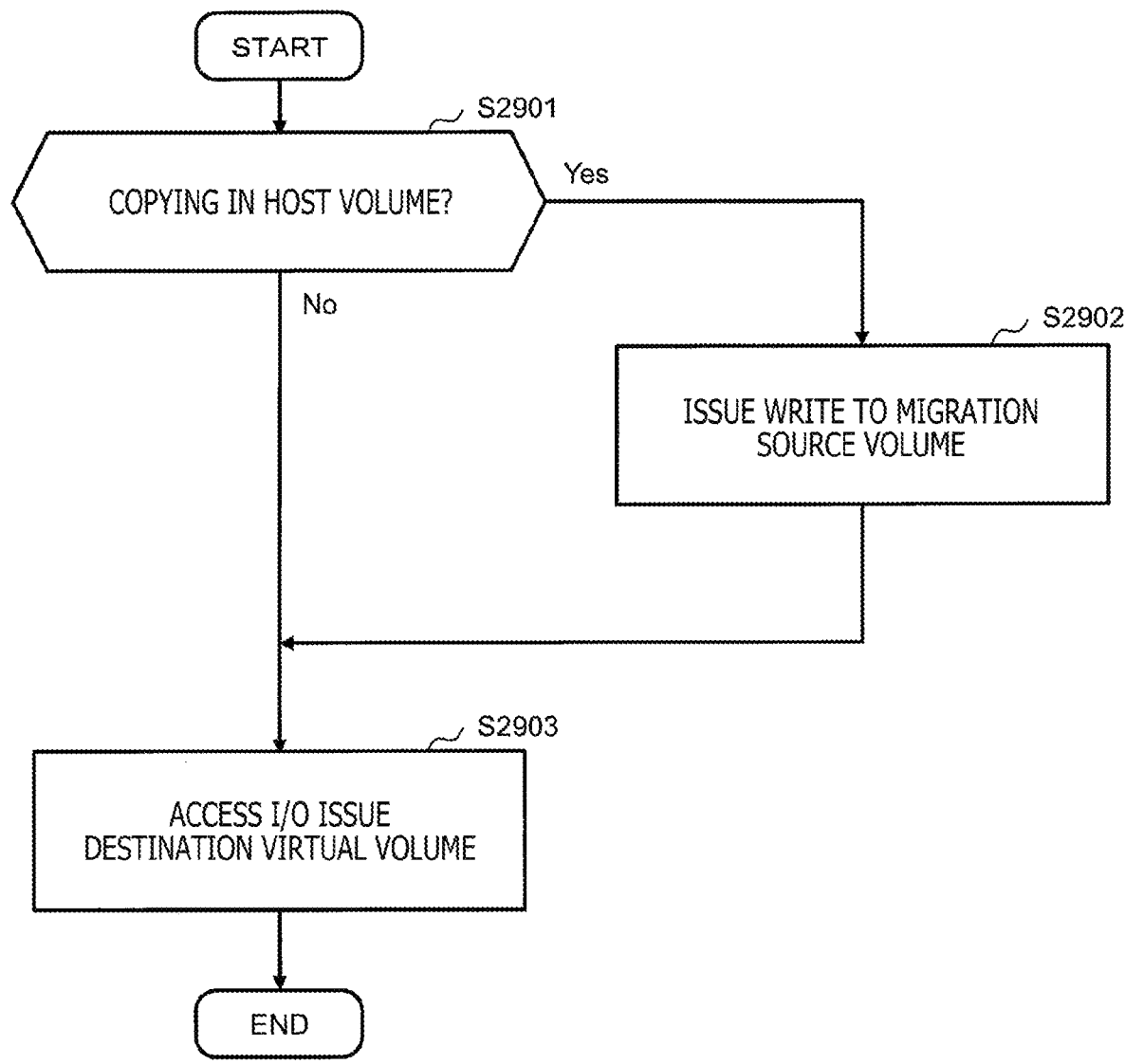
FIG. 29 is a diagram illustrating an example of a flowchart related to host write I/O processing according to a second embodiment.

FIG. 29 is a diagram illustrating an example of a flowchart related to the host write I/O processing according to the present embodiment.

First, the front-end driver 301 judges whether the copy state of the host volume is "Copying" (step S2901). In the case where the front-end driver 301 judges that the copy state of the host volume is "Copying," the front-end driver 301 moves the processing to step S2902. On the other hand, in the case where the front-end driver 301 judges that the copy state of the host volume is not "Copying," the front-end driver 301 moves the processing to step S2903.

In step S2902, the front-end driver 301 issues a migration source volume write request. Thereafter, the front-end driver 301 moves the processing to step S2903 as in the first embodiment.

As a result, a write request continues to be issued to the migration source volume even during migration, thus allowing the most recent data to be also retained in the migration source volume. The second embodiment differs from the first embodiment in this respect.

Figure 30:
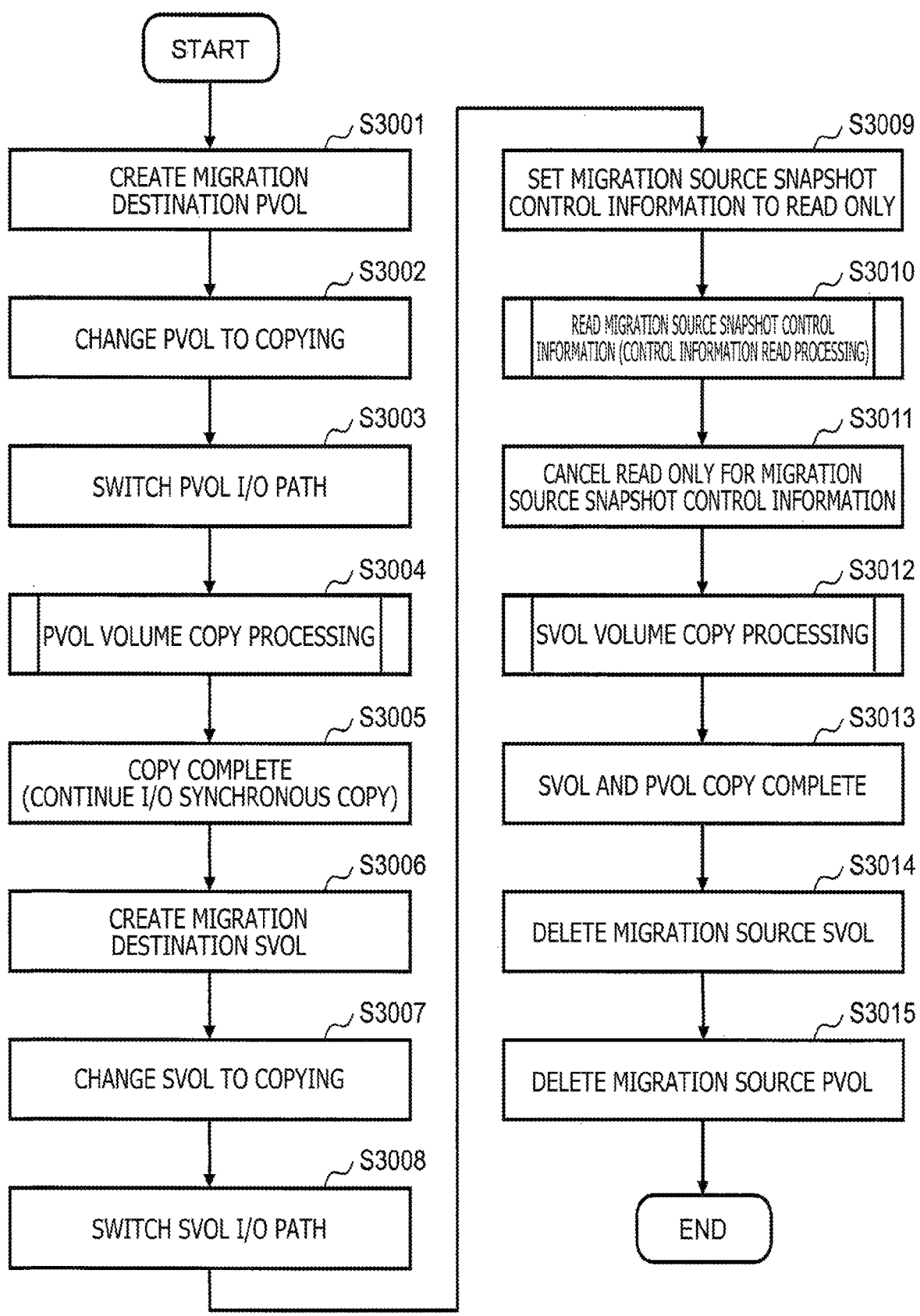
FIG. 30 is a diagram illustrating an example of a flowchart related to volume migration processing involving a snapshot according to the second embodiment.

FIG. 30 is a diagram illustrating an example of a flowchart related to the volume migration processing involving a snapshot. Steps from S3001 to S3015 are similar to steps S2801 to S2815 in FIG. 28. The second embodiment differs from the first embodiment in that the processing corresponding to step S2811 in FIG. 28 has been deleted after step S3010, that step S3011 has been added, and that the processing in steps S3005 and S3013 has been changed.

In the present embodiment, the most recent data is retained in the migration source volume as described above, and the snapshot thereof is also the most recent. This eliminates the need for merging of the differences during migration carried out in step S2811 in FIG. 28. Instead, I/O to and from the migration source volume continues. Therefore, the processing in step S3005 is changed so that when the fact that the PVOL copy has reached the end of the volume is detected, the copy state of the host volume is left as "Copying" rather than being changed to "No." Instead, the copy states of the PVOL and the SVOL are changed to "No" when the fact that the SVOL copy has reached the end of the volume is detected, in step S3013. After the migration controller 305 reads snapshot control information in step S3010, the read-only setting is cancelled for the snapshot control information, and the access right is changed to the migration source storage node 102 (step S3011).

In the present embodiment, the migration source virtual volume also retains the most recent state. Therefore, in the case where the migration of a virtual volume is cancelled, it is only necessary to delete the migration destination virtual volume without performing processing for placing the migration source virtual volume into the most recent state at the time of cancellation, thus making it possible to speedily cancel the migration of the virtual volume.

(3) Third Embodiment

Figure 31:
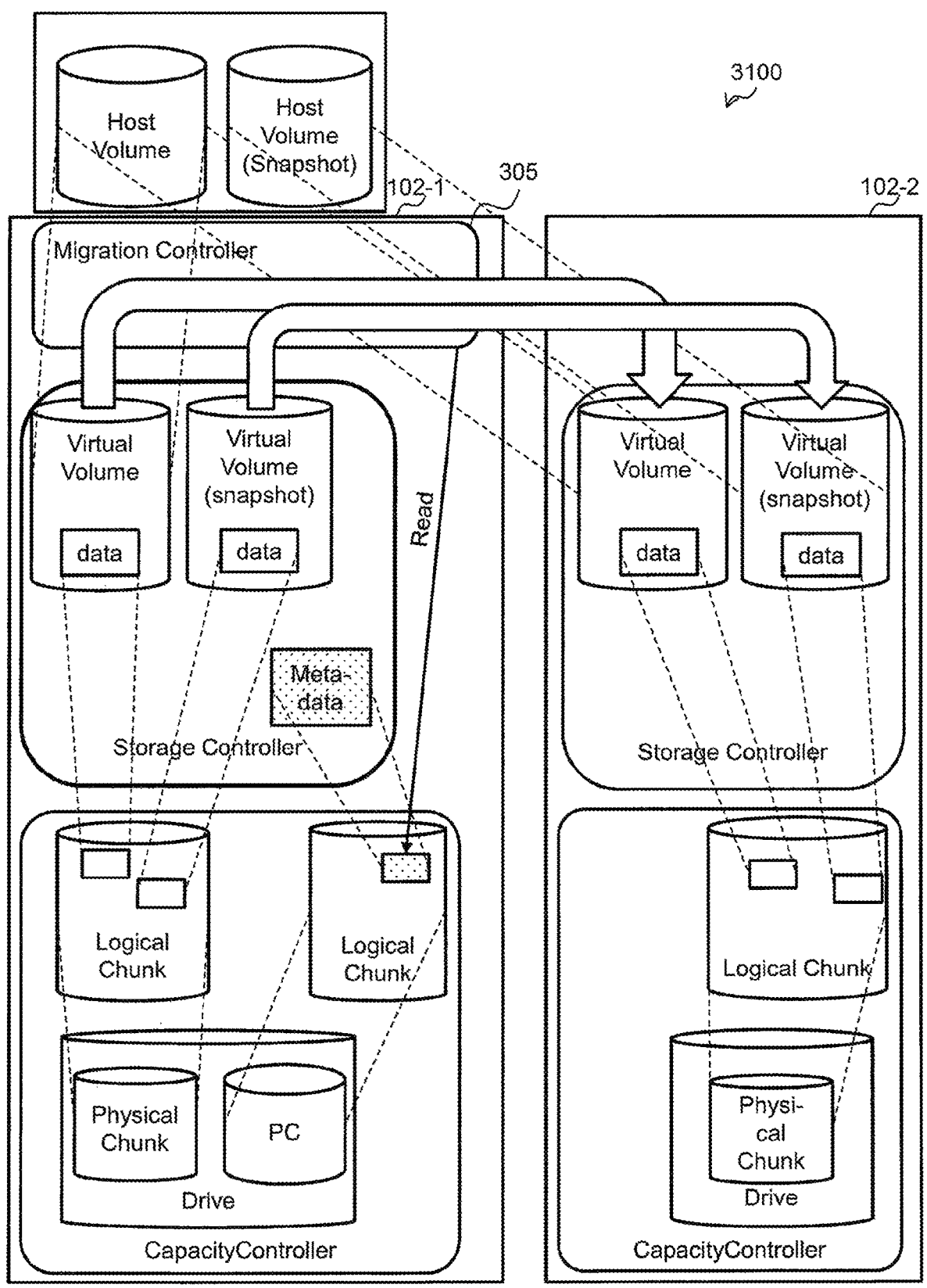
FIG. 31 is an overview diagram of a storage system according to a third embodiment.

FIG. 31 is an overview diagram of a storage system 3100 according to the present embodiment. The third embodiment differs from the first embodiment with regard to its configuration in that the migration controller 305 works in the storage node 102-1 of the migration source rather than in the storage node 102-2 of the migration destination. The third embodiment is identical to the first embodiment in other configuration.

The present embodiment eliminates the need for exchange of control information between the storage nodes 102, thus contributing to reduced communication traffic between the storage nodes 102.

(4) Fourth Embodiment

In the present embodiment, the volume migration processing 521 illustrated in the first embodiment is different.

Figure 32:
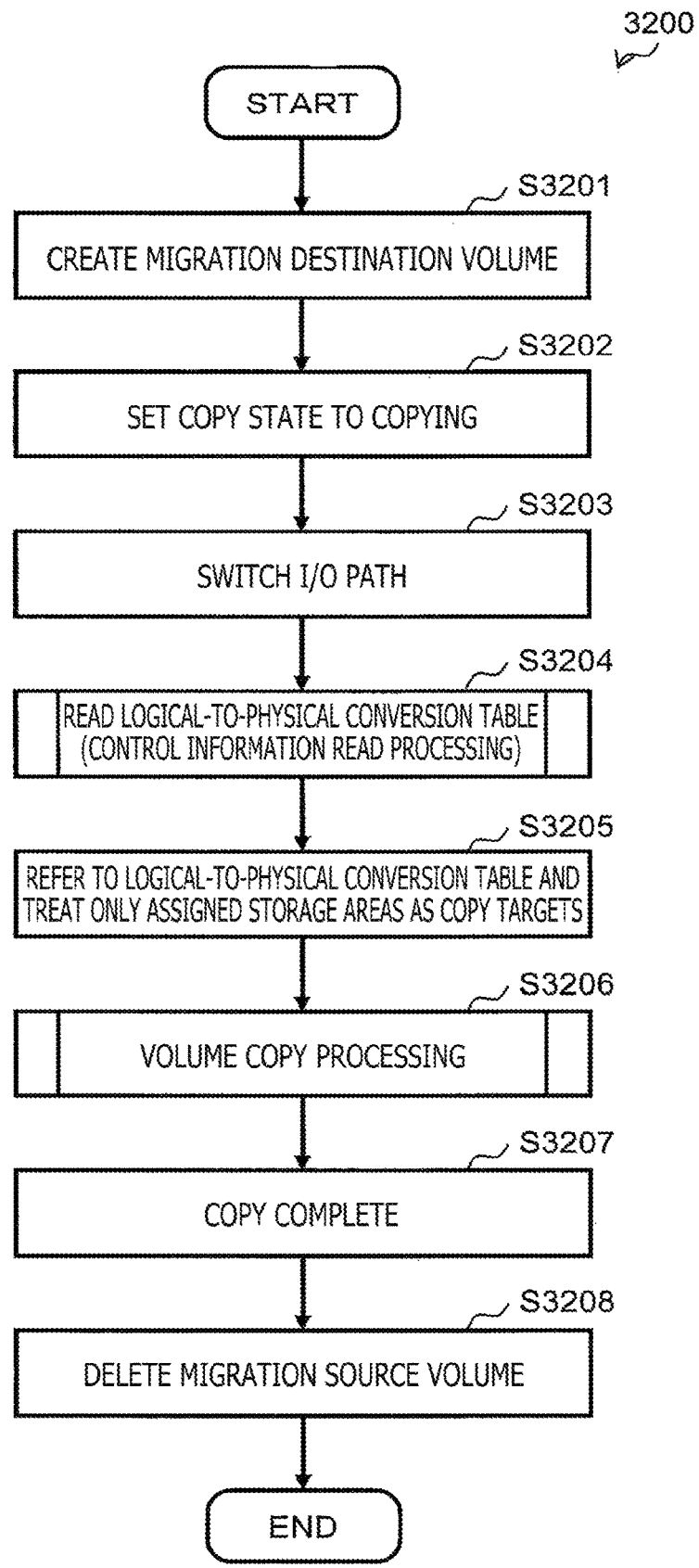
FIG. 32 is a diagram illustrating an example of a flowchart related to volume migration processing according to a fourth embodiment.

FIG. 32 is a diagram illustrating an example of a flowchart related to volume migration processing 3200 according to the present embodiment. Although steps up to S3203 are identical to steps from S2601 to S2603 in FIG. 26, the present embodiment is different in that steps S3204 and S3205 have been added after step S3203.

After switching the I/O path (step S3203), the migration controller 305 calls the control information read processing 515 and reads the logical-to-physical conversion table 700 of the migration source (step S3204).

Next, the migration controller 305 refers to the read logical-to-physical conversion table 700 and generates the copy target table 1500 in which "Yes" is set in the copy target 1502 for the virtual volume address 1501 of the assigned storage area (step S3205). In step S3206, the volume copy processing 522 is performed by specifying the copy target table 1500 like that described above, thus preventing an unassigned storage area from being copied.

In the present embodiment, data in the storage area not assigned to the virtual volume is not copied during migration of a virtual volume. This permits reduction in amount of data copied, thus contributing to reduced time required for migration of the virtual volume.

(5) Fifth Embodiment

In the present embodiment, the migration of a virtual volume during failure of the storage node 102 will be described.

Figure 33:
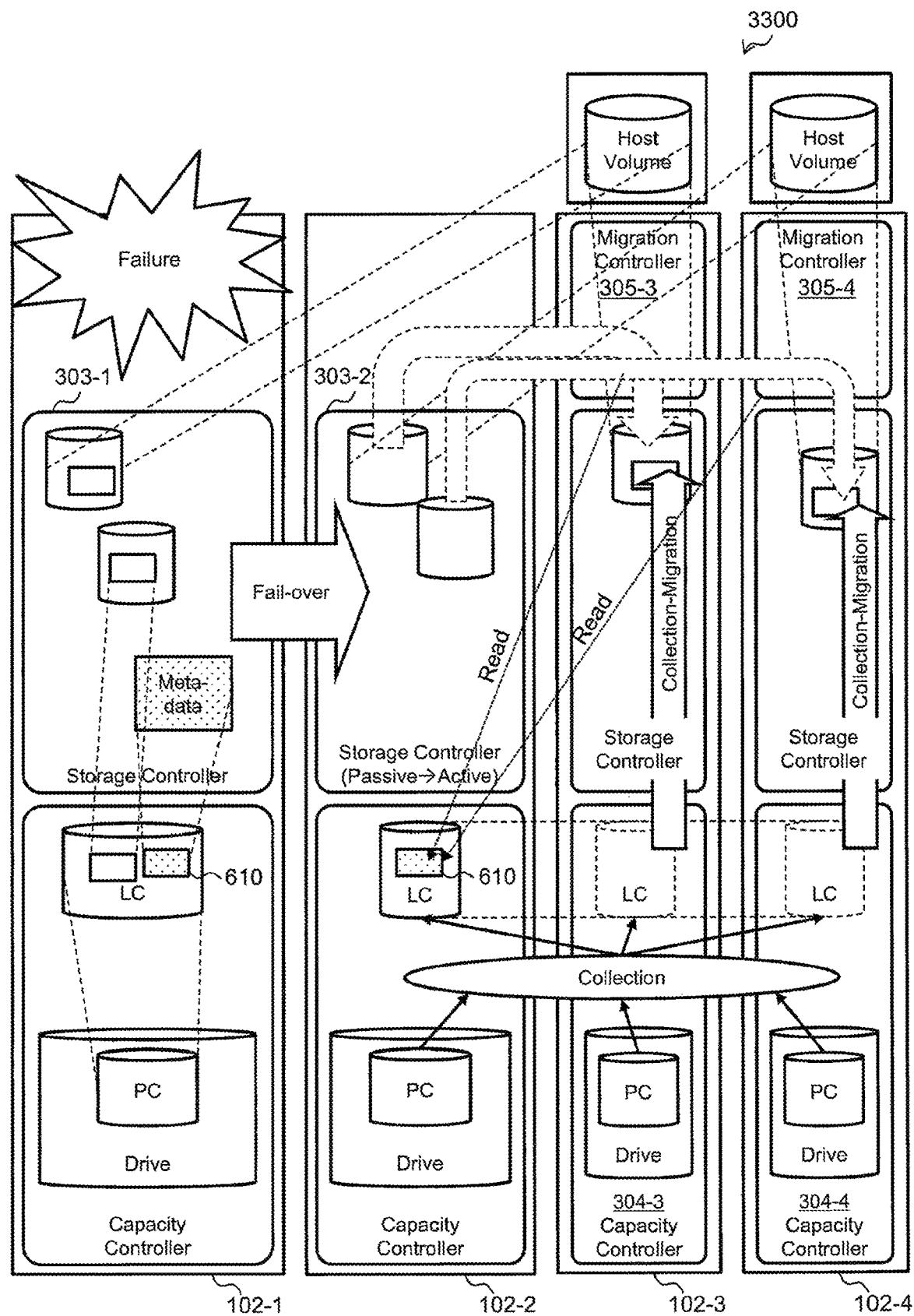
FIG. 33 is an overview diagram of a storage system according to a fifth embodiment.

FIG. 33 is an overview diagram of a storage system 3300 according to the present embodiment.

In the event of a failure of the storage node 102-1, failover processing is performed between the storage controllers 303 that form a redundant group, switching the passive storage controller from passive mode to active mode in the redundant group corresponding to the active storage controller in active mode provided in the storage node 102-1 that has failed. For example, the storage node 102-2 in which the passive storage controller in passive mode is provided switches the passive storage controller from passive mode to active mode.

The physical chunk provided in a storage device 203-1 that is present in the storage node 102-1 that has failed becomes inaccessible. In the chunk read processing that reads from the logical chunks corresponding to this physical chunk, therefore, the storage node 102-1 is restored first by using the physical chunk data that has been made redundantly available in the other storage nodes 102 (storage nodes 102-2, 102-3, and 102-4 in the present example), followed by data read. The term "restoration" refers to reading of data from other physical chunk in an 'as-is' manner in the case of mirroring (e.g., duplication, triplication) and to restoration of original data by computations from data and parity in other physical chunk in the case of EC. This is referred to as a correction read.

On the other hand, when the storage node 102-1 fails, a higher load is imposed on the storage node 102-2 to which the passive storage controller, a failover destination, that is now in active mode belongs. Therefore, there are cases in which it is desirable that the virtual volume in the passive storage controller and the snapshot volume associated with the virtual volume should be migrated to other storage node 102 to ensure distribution of the load.

For this reason, in the storage system 3300, the migration controller 305 of the migration destination of each of the respective virtual volumes (migration controller 305-3 or 305-4 in the present example) sets the access right of the logical chunk to "ALL (read only)" first and reads the control information 610. The capacity controller 304 of the migration destination of each volume (capacity controller 304-3 or 304-4 in the present example) restores and reads out this information by a correction read. The migration controller 305 of the migration destination can reduce communication traffic between the storage nodes 102 by reading out the data and the control information 610 of the migration source directly into the storage node 102 of the migration destination.

In the present embodiment, the storage node 102-2 of the failover destination does not restore a virtual volume and migrate the virtual volume to the other storage nodes 102-3 and 102-4. Instead, the virtual volume is directly restored by the other storage nodes 102-3 and 102-4, thus contributing to reduced communication traffic between the storage nodes 102.

(6) Other Embodiments

It should be noted that although cases have been described in the above embodiments in which the present technology is applied to storage systems, the present technology is not limited in application thereto and is applicable to other types of systems, apparatuses, methods, and programs.

In the above embodiments, the configuration of each table is merely an example, and a table may be divided into two or more parts. Alternatively, all or some of two or more tables may be combined into a single table.

In the description given above, programs, tables, files, and other information for realizing each function can be stored in a memory, a hard disk, an SSD (Solid State Drive) or other storage apparatus, or in an IC card, an SD card, a DVD, or other recording medium.

The embodiments described above offer, for example, the following characteristic configurations:

A storage system (e.g., a storage system 100) has a plurality of storage nodes (e.g., a migration source storage node 102, a migration destination storage node 102, other storage node 102, and a management node 103). Each of the storage nodes includes a non-volatile storage apparatus (e.g., a storage device 203), a capacity controller (e.g., a capacity controller 304), and a migration controller (e.g., a migration controller 305). The non-volatile storage apparatus stores control information regarding a volume (e.g., control information, a copy-in-progress difference management table 1400). The capacity controller performs control associated with writing information to and reading information from the storage apparatus. The migration controller migrates the volume. When the volume is migrated between the storage nodes, the capacity controller updates the control information in response to the migration of the volume performed by the migration controller (refer, for example, to FIG. 23).

The above configuration stores control information in a non-volatile storage apparatus. Therefore, even in the case where the storage nodes are general-purpose computer apparatuses with no batteries, control information will not be lost in the event of the storage system going down due to a power outage during migration of a volume. This makes it possible to resume the volume migration by reading out the control information from the storage apparatus when the storage system is restored.

A first storage node of a migration source of the volume (e.g., the migration destination storage node 102-1) includes a first storage controller (e.g., an active storage controller), anon-volatile first storage apparatus (e.g., a storage device 203-1), and a first capacity controller (e.g., a capacity controller 304-1). The first storage controller manages the volume. The non-volatile first storage apparatus stores first control information regarding the volume. The capacity controller performs control associated with writing information to and reading information from the non-volatile first storage apparatus. When the migration of the volume is initiated, the migration controller grants to other process a right to refer to the first control information (refer, for example, to FIG. 28). When a request is made to refer to the first control information from a given process (e.g., the capacity controller 304 of the storage node 102 having the migration controller 305, other program of the own storage node 102), the first capacity controller sends the first control information to the given process (refer, for example, to FIG. 16).

The above configuration makes it possible to avoid, for example, differences arising between first control information stored in the first storage apparatus and first control information received by a given process attributable to freezing of the first control information sent to the given process.

The first control information includes snapshot control information (e.g., snapshot difference management table 900) for managing differential information between the volume and a snapshot volume of the volume (e.g., presence or absence of differences between the SVOL and the PVOL). When the migration of the snapshot volume is initiated, the migration controller switches a path from the first storage node over to the storage node of a migration destination of the volume and grants to other process a right to refer to the snapshot control information (refer, for example, to FIG. 28).

In the above configuration, for example, the migration of the snapshot volume can be accomplished properly by switching the path over to the migration destination storage node and freezing the snapshot function of the first storage node, the migration source, before the migration of the snapshot volume.

The control information includes migration-in-progress control information (e.g., copy-in-progress difference management table 1400) for managing differential information during migration of the volume. The migration controller identifies differential data from the migration-in-progress control information and the snapshot control information (e.g., generates the copy target table 1500) and copies the identified differential data from the first storage node to the migration destination storage node (refer, for example, to FIG. 28).

The above configuration eliminates communication attributable to unnecessary data copies, thus contributing to reduced communication traffic between the storage nodes.

The storage node of the migration destination of the volume (e.g., migration destination storage node 102-2)

includes a front-end driver (e.g., front-end driver 301) that accepts I/O requests from a host apparatus to the migration destination volume of the volume. In the case where a write request is received from the host apparatus, and when the front-end driver judges that the migration of the volume is in progress, the front-end driver sends the write request to the storage node of the migration source of the volume (refer, for example, to FIG. 29).

In the above configuration, the migration source volume also retains the most recent state. For example, therefore, in the case where the migration of the volume is cancelled, it is only necessary to delete the migration destination volume without performing processing for placing the migration source volume into the most recent state at the time of cancellation, thus allowing for speedy cancellation of the volume migration.

The storage node is the storage node of the migration destination of the volume (refer, for example, to FIG. 6).

The above configuration permits distribution of the load associated with the migration of the volumes thanks to a migration controller provided in the migration destination storage node when a plurality of volumes of a storage node are migrated to a plurality of storage nodes.

The storage node is the storage node of the migration source of the volume (refer, for example, to FIG. 31).

The above configuration eliminates the need for exchange of control information between the storage nodes, thus contributing to reduced communication traffic between the storage nodes.

The first control information includes storage area information (e.g., logical-to-physical conversion table 700) that permits, of the storage area of the first storage apparatus, identification of the storage area assigned to the volume. The migration controller copies, of the storage area of the first storage apparatus, the data in the storage area assigned to the volume, to the storage node of the migration destination of the volume on the basis of the storage area information (refer, for example, to FIG. 32).

In the above configuration, for example, data in the storage area not assigned to the volume is not copied during migration of the volume. This permits reduction in amount of data copied, thus contributing to reduced time required for migration of the volume.

The first storage node includes a first storage controller in active mode (e.g., active storage controller). The second storage node (e.g., storage node 102-2) includes a second storage controller in passive mode (e.g., passive storage controller), a non-volatile second storage apparatus (e.g., storage device 203-2), and a second capacity controller (e.g., capacity controller 304-2). The second storage controller in passive mode forms a redundant pair with the first storage controller. The non-volatile second storage apparatus stores the first control information. The second capacity controller performs control associated with writing information to and reading information from the second storage apparatus. In the case where the first storage node fails, the second storage node switches the second storage controller to active mode. The migration controller grants to all processes a right to refer to the first control information as read-only information. The second capacity controller sends the first control information to the migration controller. The migration controller restores the volume in a third storage node (e.g., storage node 102-3 or 102-4) by using the first control information (refer, for example, to FIG. 33).

The above configuration restores the volume in a third storage node without restoring the volume in the second storage node to ensure distribution of the load imposed on the second storage node attributable to provision of the volume of the faulty first storage node in the second storage node. In this way, the second storage node does not restore a volume and migrate the volume to the third storage node. Instead, the volume is directly restored by the third storage node, thus contributing to reduced communication traffic between the storage nodes 102.

The above configurations may be changed, rearranged, combined, or omitted as appropriate within the gist of the present technology.

What is claimed is:

1. A storage system including a plurality of storage nodes, each of the storage nodes comprising:
   a non-volatile storage apparatus adapted to store control information regarding a volume;
   a capacity controller adapted to perform control associated with writing information to and reading information from the storage apparatus; and
   a migration controller adapted to migrate the volume, wherein
   when the volume is migrated between the storage nodes, the capacity controller updates the control information in response to the migration of the volume performed by the migration controller, wherein
   a first storage node of a migration source of the volume includes:
      a first storage controller adapted to manage the volume;
      a non-volatile first storage apparatus adapted to store first control information regarding the volume; and
      a first capacity controller adapted to perform control associated with writing information to and reading information from the non-volatile first storage apparatus, and
   when the migration of the volume is initiated, the migration controller grants, to another process, a right to refer to the first control information, and
   when a request is made to refer to the first control information from a given process, the first capacity controller sends the first control information to the given process.

2. The storage system of claim 1, wherein
   the first control information includes snapshot control information for managing differential information between the volume and a snapshot volume of the volume, and
   when the migration of the snapshot volume is initiated, the migration controller switches a path from the first storage node over to the storage node of a migration destination of the volume and grants to the another process, a right to refer to the snapshot control information.

3. The storage system of claim 2, wherein
   the control information includes migration-in-progress control information for managing differential information during migration of the volume, and
   the migration controller identifies differential data from the migration-in-progress control information and the snapshot control information, and copies the identified differential data from the first storage node to the migration destination storage node.

4. The storage system of claim 1, wherein
   the storage node of the migration destination of the volume includes:
      a front-end driver adapted to accept I/O requests from a host apparatus to the migration destination volume of the volume, and in a case where a write request is received from the host apparatus, and when the front-end driver judges that the migration of the volume is in progress, the front-end driver sends the write request to the storage node of the migration source of the volume.

5. The storage system of claim 1, wherein
the storage node is the storage node of the migration destination of the volume.

6. The storage system of claim 1, wherein
the storage node is the storage node of the migration source of the volume.

7. The storage system of claim 1, wherein
the first control information includes storage area information that permits identification of a storage area, of the non-volatile first storage apparatus, assigned to the volume, and
the migration controller copies the data in the storage area assigned to the volume, to the storage node of the migration destination of the volume on a basis of the storage area information.

8. The storage system of claim 1, wherein
the first storage node includes:
  a first storage controller in active mode,
the second storage node includes:
  a second storage controller in passive mode adapted to form a redundant pair with the first storage controller;
  a non-volatile second storage apparatus adapted to store the first control information; and
  a second capacity controller adapted to perform control associated with writing information to and reading information from the second storage apparatus,
in a case where the first storage node fails, the second storage node switches the second storage controller to active mode, and the migration controller grants to all processes a right to refer to the first control information as read-only information, the second capacity controller sends the first control information to the migration controller, and
the migration controller restores the volume in a third storage node by using the first control information.

9. A storage control method in a storage system having a plurality of storage nodes, each of the storage nodes including
  a non-volatile storage apparatus adapted to store control information regarding a volume, the storage control method comprising:
  a first step in which a capacity controller performs control associated with writing information to and reading information from the storage apparatus; and
  a second step in which a migration controller migrates the volume, wherein
when the volume is migrated between the storage nodes, the capacity controller updates the control information in response to the migration of the volume, the migration being performed by the migration controller, wherein
a first storage node of a migration source of the volume includes:
  a first storage controller adapted to manage the volume; and
  a non-volatile first storage apparatus adapted to store first control information regarding the volume;
the storage control method further comprising:
  during the first step, a first capacity controller performs control associated with writing information to and reading information from the non-volatile first storage apparatus, and
  during the second step, when the migration of the volume is initiated, the migration controller grants, to another process, a right to refer to the first control information, and
  a third step in which, when a request is made to refer to the first control information from a given process, the first capacity controller sends the first control information to the given process.

* * * * *